United States Patent [19]

Thuraisngham et al.

[11] Patent Number: 5,355,474
[45] Date of Patent: Oct. 11, 1994

[54] SYSTEM FOR MULTILEVEL SECURE DATABASE MANAGEMENT USING A KNOWLEDGE BASE WITH RELEASE-BASED AND OTHER SECURITY CONSTRAINTS FOR QUERY, RESPONSE AND UPDATE MODIFICATION

[76] Inventors: Bhavani M. Thuraisngham, 209 Katardin Rd., Lexington, Mass. 02173; William R. B. Ford, 13 Coach Rd., Billerica, Mass. 01862; Marie S. Collins, 4452 Wordsworth Rd., Plano, Tex. 75093; Jonathan P. O'Keeffe, 70 JFK Blvd., Somerset, N.J. 08873

[21] Appl. No.: 767,258

[22] Filed: Sep. 27, 1991

[51] Int. Cl.$^5$ ............................................ G06F 15/40
[52] U.S. Cl. .................................... 395/600; 380/4; 380/25; 395/650; 395/725; 364/DIG. 1; 364/274; 364/282.1; 364/283.3; 364/283.4; 364/286.5; 364/286.6
[58] Field of Search ................. 395/51, 600, 650, 725; 380/4, 25; 364/578

[56] References Cited

U.S. PATENT DOCUMENTS

| | | | |
|---|---|---|---|
| 4,123,747 | 10/1978 | Lancto et al. | 380/25 |
| 4,672,572 | 6/1987 | Alsberg | 380/23 |
| 4,791,561 | 12/1988 | Huber | 395/600 |
| 4,866,635 | 9/1989 | Kahn et al. | 395/51 |
| 4,882,752 | 11/1989 | Lindman et al. | 380/25 |
| 5,016,204 | 1/1991 | Simoudis et al. | 364/578 |
| 5,075,884 | 12/1991 | Sherman et al. | 395/650 |
| 5,126,728 | 6/1992 | Hall | 380/825.3 |
| 5,129,685 | 10/1992 | Kung | 395/575 |
| 5,175,800 | 12/1992 | Galis et al. | 395/51 |
| 5,193,185 | 3/1993 | Lanter | 395/600 |
| 5,201,047 | 4/1993 | Waki et al. | 395/600 |
| 5,265,221 | 11/1993 | Miller | 395/725 |
| 5,278,946 | 1/1994 | Shimada et al. | 395/62 |

OTHER PUBLICATIONS

Lunt et al, The SeaView Security Model, IEEE Trans. on Software Engineering, vol. 16, No. 6, 1990, pp. 593–607.

Lunt et al, A Near $\propto$ Term Design for the SeaView Multilevel Database System, Proc. of the IEEE Symposium on Security and Privacy, 1988, pp. 234–244.

Primary Examiner—Thomas C. Lee
Assistant Examiner—Wayne Amsbury
Attorney, Agent, or Firm—Choate, Hall & Stewart

[57] ABSTRACT

Apparatus for an integrated architecture for an extended multilevel secure database management system. The multilevel secure database management system processes security constraints to control certain unauthorized inferences through logical deduction upon queries by users and is implemented when the database is queried through the database management system, when the database is updated through the database management system, and when the database is designed using a database design tool.

4 Claims, 5 Drawing Sheets

P1: USER INTERFACE MANAGER
P2: CENTRAL INFERENCE CONTROLLER
P3: CONSTRAINT GATHERER
P4: SANITIZER
P5: RELEASE DATABASE

SYSTEM FOR MULTILEVEL SECURE DATABASE MANAGEMENT USING A KNOWLEDGE BASE WITH RELEASE-BASED AND OTHER SECURITY CONSTRAINTS FOR QUERY, RESPONSE AND UPDATE MODIFICATION

BACKGROUND OF THE INVENTION

It is possible for the users of a database management system to draw inferences from the information that they obtain from the database. The inference process can be harmful if the inferred knowledge is something that the user is not authorized to acquire. That is, a user acquiring information which he is not authorized to know has come to be known as the inference problem in database security. In a multilevel operating environment, the users are cleared at different security levels as they access a multilevel database where the data is classified at different sensitivity levels. A multilevel secure database management system (MLS/DBMS) manages a multilevel database where its users cannot access data to which they are not authorized. Currently available multilevel secure database management systems cannot provide a solution to the inference problem, where users of the system issue multiple requests and consequently infer unauthorized knowledge.

Two distinct approaches to handling the inference problem have been proposed in the past. They are:
 (i) Handling of inferences during database design.
 (ii) Handling of inferences during query processing.

The work reported in Morgenstern, M., May 1987, "Security and Inference in Multilevel Database and Knowledge Base Systems," Proceedings of the ACM SIGMOD Conference, San Francisco, Calif.; Hinke, T., April 1988, "Inference Aggregation Detection in Database Management Systems," Proceedings of the IEEE Symposium on Security and Privacy, Oakland, Calif.; Smith, G., May 1990, "Modelling Security-Relevam Data Semantics," Proceedings of the 1990 IEEE Symposium on Security and Privacy, Oakland, Calif.; and Lunt, T., May 1989, "Inference and Aggregation, Facts and Fallacies," Proceedings of the IEEE Symposium on Security and Privacy, Oakland, Calif. focuses on handling inferences during database design where suggestions for database design tools are given.

In contrast, the work reported in Thuraisingham, B., December 1987, "Security Checking in Relational Database Management Systems Augmented with Inference Engines," Computers and Security, Volume 6, No. 6.; Thuraisingham, B., August 1990, The Use of Conceptual Structures in Handling the Inference Problem, Technical Report M90-55, The MITRE Corporation, Bedford, Mass.; Keefe, T., B. Thuraisingham, and W. Tsai, March 1989, "Secure Query Processing Strategies," IEEE Computer, Volume 22, No. 3, pp. 63-70 focuses on handling inferences during query processing.

Other work on handling the inference problem can be found in Buczkowski, L.J., and Perry, E.L., "Database Inference Controller," Interim Technical Report, Ford Aerospace Corporation, February 1989, where an expert system tool which could be used by the System Security Officer off-line to detect and correct logical inferences is proposed. Rowe, N., February 1989, "Inference Security Analysis Using Resolution Theorem-Proving," Proceedings of the 5th International Conference on Data Engineering, Los Angeles, Calif. investigates the use of Prolog for handling inferences.

In Thuraisingham, B., August 1990, The Use of Conceptual Structures in Handling the Inference Problem, Technical Report M90-55, The MITRE Corporation, Bedford, Mass. various strategies that users could utilize to draw inferences are identified. This set of strategies is more complete than the one proposed in Denning, D.E., et al., "Views as a Mechanism for Classification in Multilevel Secure Database Management Systems," Proceedings of the IEEE Symposium on Security and Privacy, Oakland, Calif. 1986. In Thuraisingham, B., August 1990, The Use of Conceptual Structures in Handling the Inference Problem, Technical Report M90-55, The MITRE Corporation, Bedford, Mass., some preliminary ideas on novel approaches to handling the inference problem are discussed. These include approaches based on mathematical programming, inductive inference, information theory and game theory. Further, in Thuraisingham, B., August 1990, The Use of Conceptual Structures in Handling the Inference Problem. Technical Report M90-55, The MITRE Corporation, Bedford, Mass. complexity of the inference problem is analyzed based on concepts in recursive function theory.

The present application discloses an apparatus and method for designing a multilevel secure database management system that can resolve the inference problem via the effective use of security constraints. In the new system, some security constraints are handled during the query operation, some during the update operation, some during the database design operation. The major advance achieved by the invention disclosed herein over prior art is the use of security constraints in a novel way to handle the inference problem. In addition, prototypes which effectively handle these constraints are also disclosed. Further advances relate to the use of conceptual structures for representing and reasoning about multilevel applications, the development of a logic for secure data/knowledge base management systems and the development of a knowledge base inference controller.

SUMMARY OF THE INVENTION

The invention disclosed herein is an apparatus and method for querying, designing and updating a multilevel secure database management system in order to resolve the inference problem.

A method for processing security constraints in a multilevel secure database management system are disclosed. Security constraints are rules that assign security levels to data. This method is based on specifying security constraints as horn clauses. The apparatus and method disclosed here uses nine types of security constraints:

1. Simple constraints that classify a database, a relation or an attribute;
2. Content-based constraints that classify any part of the database depending on the value of some data;
3. Event-based constraints that classify any part of the database depending on the occurrence of some real-world event;
4. Association-based constraints that classify associations between attributes and relations;
5. Release-based constraints that classify any part of the database depending on the information that has been previously released;
6. Aggregate constraints that classify collections of data;

7. Level-based constraints that classify any part of the database depending on the security level of some data;
8. Fuzzy constraints that assign fuzzy values to their classifications; and
9. Logical constraints that specify implications.

The method and apparatus disclosed are based on processing certain security constraints during query processing, certain constraints during database updates and certain constraints during database design. FIG. 1 shows a schematic view of the integrated architecture. The two main tasks involved in constraint handling are constraint generation and constraint enforcement. The constraint generator takes the specification of the multilevel application and outputs the initial schema and the constraints that must be enforced. The database design tool takes this output as its input and designs the database. The constraints and schema produced by the database design tool are used by the update processor and the query processor. Although the query processor, update processor and database design tool are separate modules, they all constitute the solution to constraint processing in multilevel relational databases; these three approaches provide an integrated solution to security constraint processing in a multilevel environment. In the architecture shown in FIG. 1, the constraints and schema which are produced by the constraint generator are processed further by the database design tool. The modified constraints are given to the constraint updater in order to update the constraint database. The schema is given to the MLS/DBMS to be stored in the metadatabase. The constraints in the constraint database are used by the query and update processors. We assume that there is a trusted constraint manager process which manages the constraints. In a dynamic environment where the data and the constraints are changing, the query processor will examine all the relevant constraints and ensure that users do not obtain unauthorized data.

Constraints that classify an attribute or collection of attributes taken together are handled during the database design operation. These include the simple and association-based constraints. When constraints are processed during the database design operation, the database design tool will determine the security levels to be assigned to the database schema (i.e., the information about the data in the database).

A query processor is disclosed that has the ability to handle all of the security constraints. Most users usually build their reservoir of knowledge from responses that they receive by querying the database. It is from this reservoir of knowledge that they infer unauthorized information. Moreover, no matter how securely the database has been designed or how accurately the data within is labeled, users could eventually violate security by inference because they are continuously updating their reservoir of knowledge as the world evolves. It is not feasible to have to :redesign the database or to have to reclassify the data continuously. When constraints are processed during the query operation, the query processor will compute the security levels of the data before release and ensure that only the data at or before the user's level is released.

The processor (also called an inference controller) protects against certain security violations via inference that can occur when users issue multiple requests and consequently infer unauthorized knowledge. The processor also uses security constraints as its mechanism for determining the security level of data. The security constraints are used as deviation rules. The architecture for a query processor is shown in FIG. 2. This architecture can be regarded as a loose coupling between a multilevel relational database management system and a deductive manager. The deductive manager is referred to as the query processor. It operates on-line.

An update processor prototype is disclosed. The processor utilizes simple and content-dependent security constraints as guidance in determining the security level of the data being updated. The use of security constraints can thereby protect against users incorrectly labelling data as a result of logging in at the wrong level, against data being incorrectly labelled when it is imported from systems of different modes of operation and against database inconsistencies as a consequence of the security label of data in the database being affected by data being entered into the database. The architecture for the update processor is shown in FIG. 3. This architecture can be regarded as a loose coupling between a multilevel relational database management system and a deductive manager. The deductive manager is referred to as the update processor. It can be used on-line where the security levels of the data are determined during database inserts and updates, or it could be used off-line as a tool that ensures that data entered via bulk data loads and bulk data updates is accurately labelled.

The security level of an update request is determined by the update processor as follows. The simple and content-dependent security constraints associated with the relation being updated and with a security label greater than the user log in security level are retrieved and examined for applicability. If multiple constraints apply, the security level is determined by the constraint that specifies the highest classification level. If no constraints apply, the update level is the Logan security level of the user. The update processor does not determine the security level of the data solely from the security constraints, but utilizes the constraints as guidance in determining the level of the input data.

In the disclosed apparatus and method, all constraints except for the release and aggregate constraints can theoretically be handled during the database update operation. When constraints are processed during the update operation, the update processor will compute the security levels of the data being updated and ensure that the data is stored at the appropriate level.

An MLS DBMS provides assurance that all objects in a database have a security level associated with them and that users are allowed to access only the data which they are cleared. Additionally, it provides a mechanism for entering multilevel data but relies on the user to Logan at the level at which the data is to be entered. The Update Processor will provide a mechanism that can operate as a standalone tool with a MLS DBMS to provide assurance that data is accurately labelled as it is entered into the database. This could significantly enhance and simplify the ability of an MLS DBMS to assure that data entered via bulk data loads and bulk data updates is accurately labelled.

Another significant use for an update processor is in operation with an Inference Controller which functions during query processing. The Inference Controller protects against certain security violations via inference that can occur when users issue multiple requests and consequently infer unauthorized knowledge. The Inference Controller Prototype also utilizes security constraints as its mechanism for determining the security level of data. The security constraints are used as derivation rules as they are applied to the data during query processing. Addressing all of the security constraint types mentioned above could add a significant burden to the query processor particularly if the number of constraints is high. To enhance the performance of the query processor, the Update Processor can be utilized to address certain constraint types as data is entered into the database, in particular, simple and content-based constraints, alleviating the need for the query processor to handle these constraint types. We assume that the security constraints remain relatively static, as reliance on the Update Processor to ensure that data in the database remains consistent would be difficult, particularly in a volatile environment where the constraints change dynamically. An additional concern is that database updates could leave the database in an inconsistent state. The Update Processor, however, is designed to reject updates that cause a rippling effect and thus leave the database in an inconsistent state.

A method and apparatus for handling constraints during database design is disclosed. The database design tool is shown in FIG. 4. The constraint generator takes the specification of the multilevel application and outputs the initial schema and the constraints that must be enforced. The database design tool takes this output as its input and designs the database. The constraints and schema produced by the database design tool are used by the update processor and the query processor.

PREFERRED EMBODIMENT

Figure 1:
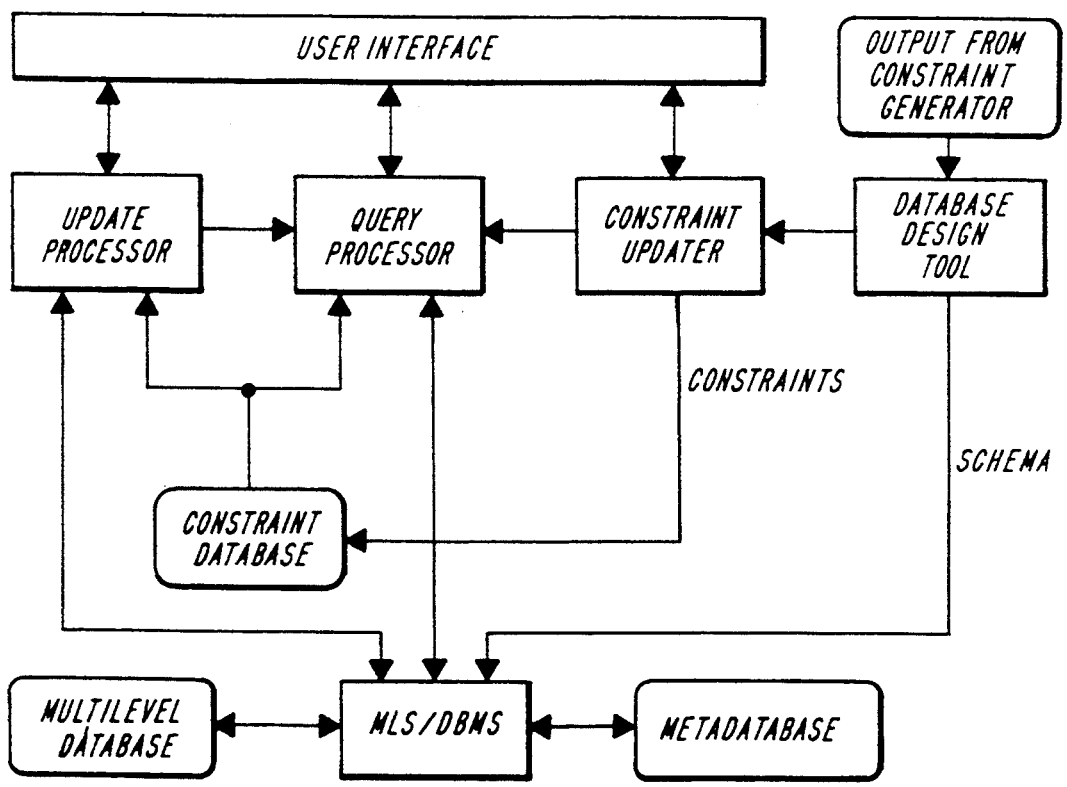
FIG. 1 is a block diagram of the integrated architecture of the invention.
Figure 2:
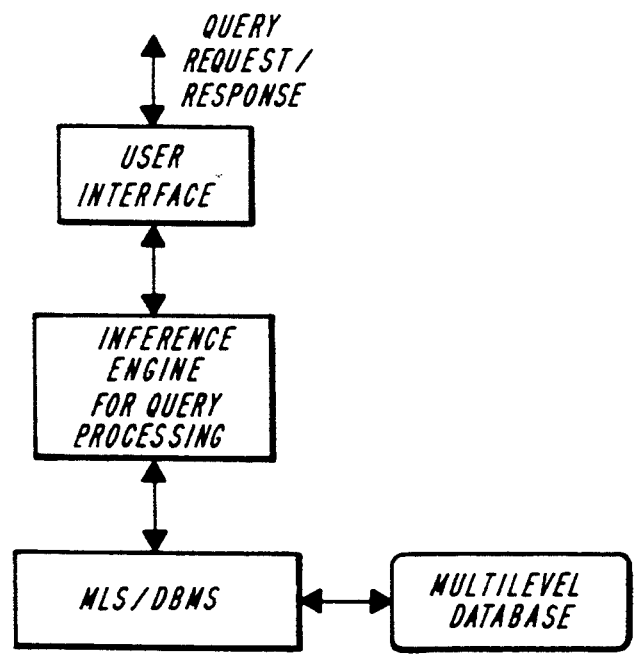
FIG. 2 is a block diagram illustrating the query processor of the invention.
Figure 3:
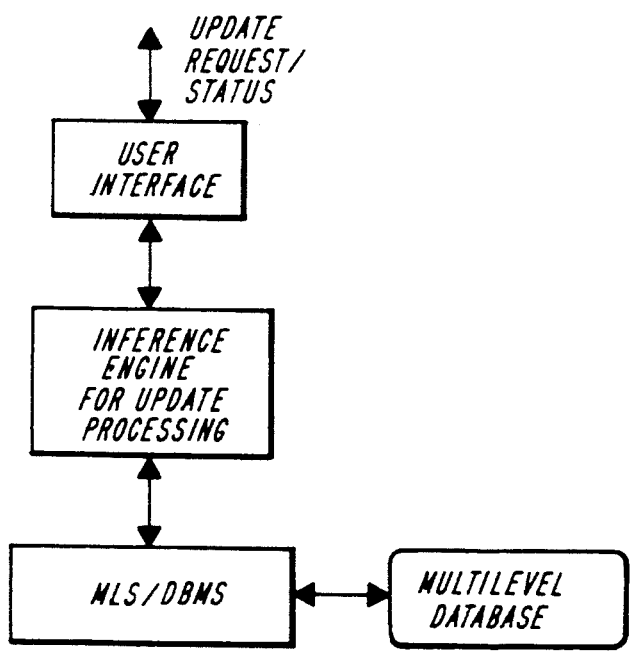
FIG. 3 is a block diagram illustrating the update processor of the invention.
Figure 4:
FIG. 4. is a block diagram illustrating a multi-level database design tool.

The theoretical approach to security constraint processing is first presented. Then we give the implementation details for the query processor, the update processor and the database design tool.

1. SECURITY CONSTRAINTS
1.1 OVERVIEW

Security constraints are rules which assign security levels to the data. They can be used either as integrity rules, derivation rules or as schema rules (such as data dependencies). If they are used as integrity rules, then they must be satisfied by the date in the multilevel database. If they are used as derivation rules, they are applied to the data during query processing. If they are used as data dependencies, they must be satisfied by the schema of the multilevel database.

We have defined various types of security constraints. They include the following:

(i) Constraints that classify a database, relation or an attribute. These constraints are called simple constraints.

(ii) Constraints that classify any part of the database depending on the value of some data. These constraints are called context-based constraints.

(iii) Constraints that classify any part of the database depending on the occurrence of some real-world event. These constraints are called event-based constraints.

(iv) Constraints that classify associations between data (such as tuples, attributes, elements, etc.). These constraints are called association-based constraints.

(v) Constraints that classify any part of the database depending on the information that has been previously released. These constraints are called release-based constraints. We have identified two types of release-based constraints. One is the general release constraint which classifies en entire attribute depending on whether any value of another attribute has been released. The other is the individual release constraint which classifies a value of another attribute depending on whether a value of another attribute has been released.

(vi) Constraints that classify collections of data. These constraints are called aggregate constraints.

(vii) Constraints which specify implications. These are called logical constraints.

(viii) Constraints which have conditions attached to them. These are called constraint with conditions.

(ix) Constraints that classify any part of the database depending on the security level of some data. These constraints are called level-based constraints.

(x) Constraints which assign fuzzy values to their classifications. These are called fuzzy constraints.

We will give examples of constraints to each category. In our examples, we assume that the database consists of two relations SHIPS and ASSIGNMENT where SHIPS has attributes S#, SNAME, CAPTAIN, and A# (with A# as the key), and ASSIGNMENT has attributes A#, MISSION, and DESTINATION (with A# as the key). Note that A# in SHIPS and A# in ASSIGNMENT takes values from the same domain. The constraints may be expressed as some form of logical rules. We have chosen horn clauses to represent the constraints. This way we could eventually take advantage of numerous techniques that have been developed for logic programs.

Simple constraints: R(A1, A2, . . . An)→Level(Ai1, Ai2, . . . Ait)=Secret [Each attribute Ai1, Ai2, . . . Ait of relation R is Secret]Example: SHIPS (S#, SNAME, CAPTAIN, A#)→Level (CAPTAIN)=Secret Content-based constraints: R(A1, A2, . . . An) AND COND (Value (B1, B2, . . . Bm))→Level (Ai1, Ai2 . . . Ait) =Secret [Each attribute Ai1, Ai2, . . . Ait of relation R is Secret if some specific condition is enforced on the value of some data specified by B1, B2, . . . Bm]Example: SHIPS (S#, SNAME, WEIGHT, A#) AND (Value (SNAME)=-CHAMPION)→Level (CAPTAIN)=Secret.

Association-based constraints (also called context or together constraints): R(A1, A2, ... An)→Level (Together (Ai1, Ai2, ... Ait))=Secret [The attributes Ai1, Ai2, ... Ait of relation R taken together are Secret]Example: SHIPS (S#, NAME, CAPTAIN, A#)→Level (Together (SNAME, CAPTAIN))=Secret.

Event-based constraints: R(A1, A2, ... An) AND Event(E)→Level (Ai1, Ai2, ... Ait)=Secret [Each attribute Ai1, Ai2, ... Ait of relation R is Secret if event E has occurred]Example: SHIPS (S#, SNAME, CAPTAIN, A#) AND Event (Change of President)→Level (CAPTAIN), A#)=Secret.

General release-based constraints: R(A1, A2, ... An) AND Release(Ai, Unclassified) CONG→Level(Aj)=Secret The attribute Aj of relation R is Secret if the attribute i has been released at the Unclassified level] Example: SHIPS(S#, SNAME, CAPTAIN, A#) AND Release(SNAME, Unclassified)→Level(CAPTAIN)=Secret.

Individual release-based constraints: R(A1, A2, ... An) AND Individual-Release(Ai, Unclassified)-→Level(Aj)=Secret The individual release-based constraints classify elements of an attribute at a particular level after the corresponding elements of another attribute have been released. They are more difficult to implement than the general release-based constraints. In our implementation, the individual release-based constraints are handled after the response is assembled while all of the other constraints are handled before the response is generated.

Aggregate constraints: Aggregate constraints classify collections of tuples taken together at a level higher than the individual levels of the tuples in the collection. There could be some semantic association between the tuples. We specify these tuples in the following form: R(A1,A2, ... An) AND Set(S,R) AND Satisfy(S,P)→Level(S)=Secret This means that if R is a relation and S is a set containing tuples of R and S satisfied some property P, then S is classified at the Secret level. Note that P could be any property such as "number of elements is greater than 10."

Logical constraints: Logical constraints are rules which are used to derive new data from the data in the database. The derived data could be classified using one of the other constraints. Logical constraints are of the form: Ai==>Aj if condition C holds. This constraint can be instantiated as follows: The location of a ship implies its mission if the location is the Persian Gulf.

Other constraints:
There are several other types of constraints which could be incorporated into our design fairly easily. These include level-based constraints and fuzzy constraints. We describe them below.

Level-based constraints: R(A1,A2, ... An) AND Level(Ai)=Unclassified →Level(Aj)=Secret (The attribute Aj of relation R is Secret if the attribute Ai is unclassified) Example: SHIPS(S#,SNAME,CAPTAIN,A#) AND Level( SNAME)=Unclassified→Level(CAPTAIN)=Secret Fuzzy Constraints: Fuzzy constraints are constraints which use fuzzy values. They can be associated with any of the other types of constraints. An example of a fuzzy constraint which is associated with a content-based constraint is given below. R(A1,A2, ... An) AND COND-(Value(B1,B2, ... Bm))→Level(Ail,Ai2, ... Ait)=Secret and Fuzzyvalue=r (Each attribute Ai1,Ai2, ... Ait of relation R is Secret with a fuzzy value of r if some specific condition is enforced on the values of some data specified by B1,B2, ... Bm)

Example: SHIPS(S#,SNAME,CAPTAIN, A#) AND (Value( SNAME )=CHAMP I 0 N)->Level(CAPTAIN)=Secret and Fuzzyvalue=0.8.

Complex constraints
The examples of constraints that we have given above are enforced on a single relations only. Note that constraints can also be enforced across relations. We call such constraints complex constraints. An example is given below:

R1(A1,A2, ... An) & R2(B1,B2, ... Bm) & R1.Ai=R2.Bj(1<i<n,i<j<m)→Level(Together(Ak,Bp))=Secret where 1<k<n,1<p<m)
This constraint states that pair of values involving the kth attribute of R1 and the pth attribute of R2 are Secret provided the corresponding values (i.e. in the same row) of the ith attribute of R1 and the jth attribute of R2 are equal.

1.2 APPROACH TO SECURITY CONSTRAINT PROCESSING

Security constraints enforce a classification policy. Therefore it is essential that constraints are manipulated only by an authorized individual. In our approach constraints are maintained by the SSO. That is, constraints are protected from ordinary users. We assume that constraints themselves could be classified at different security levels. However, they are stored at system-high. The constraint manager, which is trusted, will ensure that a user can read the constraints classified only at or below his level.

Our approach to security constraint processing is to handle certain constraints during query processing, certain constraints during database updates and certain constraints during database design. The first step was to decide whether a particular constraint should be processed during the query, update or database design operation. After some consideration, we felt that it was important for the query processor to have the ability to handle all of the security constraints. Our thesis is that inferences can be most effectively handled, and thus prevented during query processing. This is because most users usually build their reservoir of knowledge from responses that they receive by querying the database. It is from this reservoir of knowledge that they infer unauthorized information. Moreover, no matter how securely the database has been designed, users could eventually violate security by inference because they are continuously updating their reservoir of knowledge as the world evolves. It is not feasible to have to redesign the database simultaneously.

The next step was to decide which of the security constraints should be handled during database updates. After some consideration, we felt that except for some types of constraints such as the release and aggregate constraints, the others could be processed during the update operation. However, techniques for handling constraints during database updates could be quite complex as the security levels of the data already in the database could be affected by the data being updated.

Therefore, initially our algorithms handle only the simple and content-based constraints during database updates.

The constraints that seemed appropriate to handle during the database design operation were those that classified an attribute or collections of attributes taken together. These include the simple and association-based constraints. For example, association-based constraints classify the relationships between attributes. Such relationships are specified by the schema and therefore such constraint could be handled when the schema is specified. Since a logical constraint is a rule which specifies the implication of an attribute from a set of attributes, it can also be handled during database design.

Figure 5:
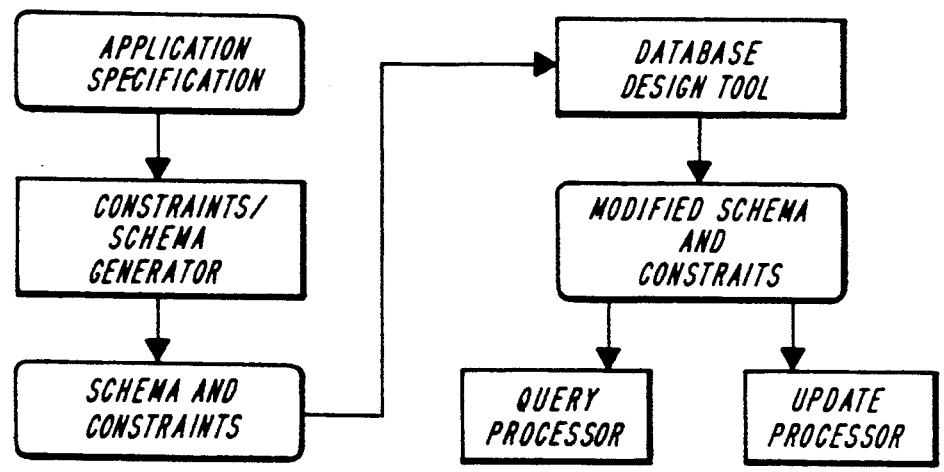
FIG. 5 is a block diagram illustrating constraint generation and enforcement.

Note that some constraints can be handled in more than one way. For example, we have the facility to handle the content-based constraints during query processing as well as during database updates. However, it may not be necessary to handle a constraint in more than one place. For example, if the content-based constraints are satisfied during the database update operation, then it may not be necessary to examine them during query processing also. Furthermore, the query operation is performed more frequently than the update operation. Therefore, it is important to minimize the operations performed by the query processor as much as possible to improve performance. However, there must be a way to handle all of the constraints during query processing. This is because, if the real-world is dynamic, then the database data may not satisfy all of the constraints that are enforced as integrity rules, or the schema may not satisfy the constraints that are processed during database design. This means that there must be a trigger which informs the query processor that the multilevel database or the schema is not consistent with the real-world; in which case the query processor can examine the additional constraints. A schematic representation of the approach to constraint generation and enforcement disclosed here is shown in FIG. 5.

2. DESIGN AND IMPLEMENTATION OF THE QUERY PROCESSOR

2.1 OVERVIEW

We first describe a security policy for handling inferences during query processing and then discuss our implementation approach.

2.1.1 SECURITY POLICY

A security policy for query processing that we propose extends the simple security property in Bell, D., and L. La Padula, July 1975, "Secure Computer Systems: Unified Exposition and Multics Interpretation," Technical Report NTIS AD-A023588, The MITRE Corporation to handle inference violations. This policy is stated below.*

Such a policy was first proposed in the LDV design [HONE87].

1. Given a security level L, E(L) is the knowledge base associated with L. That is, E(L) will consist of all responses that have been released at security level L over a certain time period and the real world information at security level L.
2. Let a user U at security level L pose a query. Then the response R to the query will be released to this user if the following condition is satisfied:

For all security levels $L^*$ where $L^*$ dominates L, if $(E(L^*)UR) = = > X$ (for any X) then $L^*$ dominates Level(X). Where $A = = > B$ means B can be inferred from A using any of the inference strategies and Level(X) is the security level of X.

We assume that any response that is released into a knowledge base at level L is also released into the knowledge bases at level $L^* \geq L$. The policy states that whenever a response is released to a user at level L, it must be ensured that any user at level $L^* \geq L$ cannot infer information classified at a level $L+ > L^*$ from the response together with the knowledge that he has already acquired. Note that while we consider only hierarchical levels in specifying the policy, it can be extended to include non-hierarchical levels also.

2.1.2 FUNCTIONALITY OF THE QUERY PROCESSOR

The strength of the query processor depends on the type of inference strategies that is can handle. Our prototype handles a limited set of inference strategies. Nevertheless it is a useful prototype which enhances the security of existing multilevel secure relational database management systems. In this section, we discuss the techniques that we have used to implement the security policy. They are: query modification and response processing. Each technique is described below.

Query modification

Query modification technique has been used in the past to handle discretionary security and views. Stonebraker, M., and E. Wong, 1974j, "Access Control in Relational Database Management Systems by Query Modification," Proceedings ACM National Conference, New York, N.Y. This technique has been extended to include mandatory security in Dwyer, P., G. Jelatis, B. Thuraisingham, Juen 1987, "Multilevel Security in Database Management Systems," *Computers and Security*, Volume 6, No. 3, pp. 252-260. In our design of the query processor, this technique is used by the inference engine to modify the query depending on the security constraints, the previous responses released, and real world information. When the modified query is posed, the response generated will not violate security.

Consider the architecture for query processing illustrated in FIG. 1. The inference engine has access to the knowledge base which includes security constraints, previously released responses, and real world information. Conceptually one can think of the database to be part of the knowledge base. We illustrate the query modification technique with examples. The actual implementation of this technique could adapt any of the proposals given in Gallaire, H., and J. Minker, 1978, *Logic and Databases*, Plenum Press for deductive query processing. Our implementation is described in section 2.2.

Consider a database which consists of relations SHIPS and ASSIGNMENT where the attributes of SHIPS are S#,SNAME,CAPTAIN and A# with S# as the key; and the attributes of ASSIGNMENT are A#, MISSION and DESTINATION with A# as the key. Let the knowledge base consist of the following rules:

1. SHIPS(X,Y,Z,D) and Z=Smith→Level(Y,Secret)
2. SHIPS(X,Y,Z,A) and A=10→Level(Y,Top Secret)
3. SHIPS(X,Y,Z,A)→Level((Y,Z),Secret)
4. SHIPS(X,Y,Z,A) and Release(Z,Unclassified)-→Level(Y,Secret)
5. SHIPS(X,Y,Z,A) and Release(Y,Unclassified)-→Level(Z,Secret)
6. NOT(Level(X,Secret) or Level(X,Top Secret))-→Level(X,Unclassified)

The first rule is a content-based constraint which classifies a ship name whose captain is Smith at the Secret level. Similarly, the second rule is also a content-based constraint which classifies a ship name whose assignment number is 10 at the Top Secret level. The third rule is an association-based constraint which classifies ship names and captains taken together at the Secret level. The fourth and fifth rules are additional restrictions that are enforced as a result of the context-based constraint specified in rule 3. The sixth rules states that the default classification level of a data item is Unclassified.

Suppose an Unclassified user requests the ship names in SHIPS.

This query is represented as follows:

SHIPS(X,Y,Z,A)

Since a ship name is classified at the Secret level if either the captain is "Smith" or the captain name is already released at the Unclassified level, and it is classified at the TopSecret level if the assignment is "10", assuming that the captain names are not yet released to an Unclassified user, the query is modified to the following:

SHIPS(X,Y,Z,D) and Z≠Smith and A≠10.

Note that since query modification is preformed in real-time, it will have some impact on the performance of the query processing algorithm. However, several techniques for semantic query optimization have been proposed recently for intelligent query processing in a non-secure environment (see, for example, Minker, J., "foundations of Deductive Database," Morgan Kaufman, 1988). These techniques could be adapted for query processing in a multilevel environment in order to improve the performance.

Response Processing

For many applications, in addition to query modification, some further processing of the response such as response sanitization may need to be performed. We will illustrate this point with examples.

EXAMPLE

Consider the following release constraints discussed earlier. That is, (i) all ship names whose corresponding captain names are already released to Unclassified users are Secret, and (ii) all captain names whose corresponding ship names are already released to Unclassified users are Secret.

Suppose an Unclassified user requests the ship names first. Depending on the other constraints imposed, let us assume that only certain names are released to the user. Then the ship names released have to be recorded into the knowledge base. Later, suppose an Unclassified user (does not necessarily have to be the same one) asks for captain names. The captain name values (some or all) are then assembled in the response. Before the response is released, the ship names that are already released to the Unclassified user need to be examined. Then the captain name value which corresponds to a ship name value that is already released is suppressed from the response. Note that there has to be a way of correlating the ship names with the captains. This means the primary key values (which is the S#) should also be retrieved with the captain names as well as be stored with the ship names in the release database.

EXAMPLE

Consider the following aggregate constraint

Suppose an Unclassified user requests the tuples in SHIPS. The response is assembled and then examined to see if it has more than 10 tuples. If so, it is suppressed.

There are some problems associated with maintaining the release information. As more and more relevant release information gets inserted, the knowledge base could grow at a rapid rate. Therefore efficient techniques for processing the knowledge base need to be developed. This would also have an impact on the performance of the query processing algorithms. Therefore, one solution would be to include only certain crucial release information in the knowledge base. The rest of the information can be stored with the audit data which can then be used by the SSO for analysis.

2.2. DESIGN AND IMPLEMENTATION

In section 2.2.1, we describe the various architectures that we considered for the implementation and the selected architecture. In section 2.2.2, we describe the representation of the constraints. In section 2.2.3, we describe the modules of the query processor. In section 2.2.4, we discuss some other issues concerning our prototype.

2.2.1 ARCHITECTURE COMPARISON

Alternate Architectures

We examined three different architectures for the implementation. A description of each architecture is given below.

(i) In the first architecture, the database as well as the knowledge base is considered to be a set of Prolog clauses. Query processing would then amount to thereon proving. Many expert system have been developed using Prolog (see, for example, Merritt, D., 1989, *Building Expert Systems in Prolog*, Springer Verlag, New York). These systems take advantage of the backward chaining mechanisms provided by Prolog. In addition, several other reasoning mechanisms have also been implemented using Prolog. Implementing the query processor in Prolog. would produce a fairly powerful system.*

* the implementations described in [ROWE89] use such an architecture.

(ii) The second alternative is to augment a relational database management system with a theorem prover implemented in Prolog. The advantages of augmenting a relational database system with an inference engine are discussed in Li, D., 1984, *A Prolog Database System*, Research Studies Press, John Wiley and Sons. Many commercial relational systems already have a Prolog interface.

(iii) As the third alternative, we considered an architecture where a multilevel relational database system was augmented with an inference engine. Such an architecture would be useful as the multilevel relational database system would ensure the enforcement of a basic mandatory security policy. The inference engine then needs to implement only the policy extensions which are enforced in order to handle inferences.

After examining the three architectures, we decided to select the third one. This was because we are interested in handling security violations via inference for database systems which are already considered to be secure. Commercial multilevel relational systems are already available. Therefore, we feel that in order to produce a useful prototype we need to use such a system which will enforce the basic mandatory security policy.

Implementation Architecture

Once we had settled on the architecture, the next task was to select a multilevel relational database system for the implementation. After investigating the various systems that were available, we selected the Secure SQL Server Sybase Inc. "Secure SQL Server," 1989 for the following reasons:

(i) for system was already available for our use,
(ii) we had prototyping experiences with the nonsecure version of SYBASE DataServer,
(iii) the system provided the basic security features that we needed.

A detailed discussion on Secure SQL Server is given in Rougeau, P., and E. Stearns, "The Sybase Secure Database Server: A Solution to the Multilevel Secure DBMS Problem," Proceedings of the 10th National Computer Security Conference, Baltimore, Md., 1987. Note that Secure SQL Server enables the use of sixteen security levels numbered 1 through 16. The basic mandatory security policy enforced is read at or below your level and write at your level.

Figure 6:
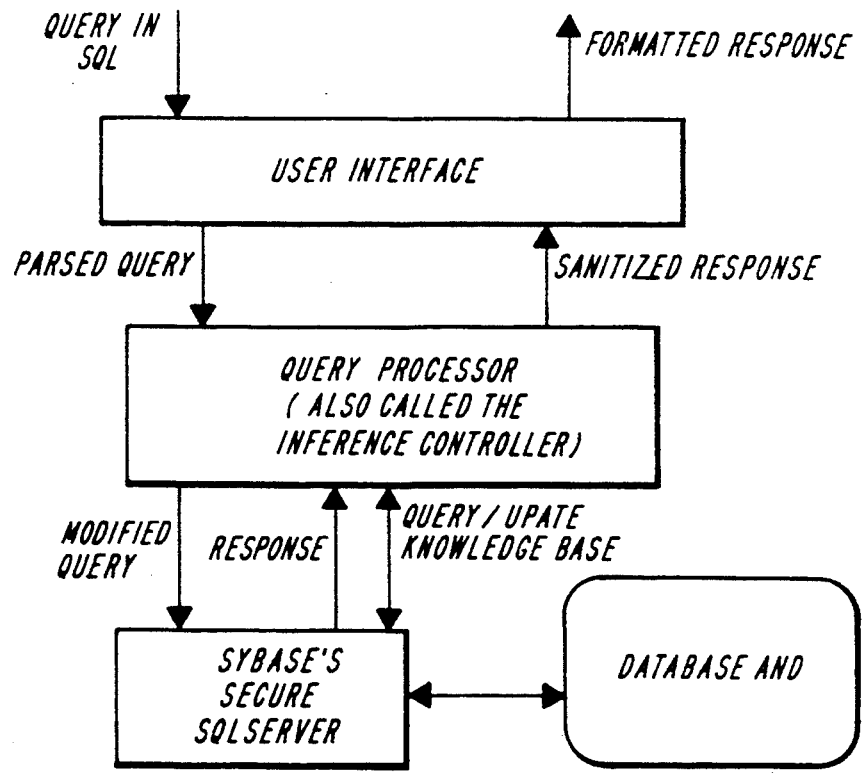
FIG. 6 is a block diagram illustrating high-level architecture.

A high level implementation architecture is shown in FIG. 6. In this architecture, the Secure SQL Server is augmented with an Inference Engine. We have stored the knowledge in the database. This way, the knowledge in the knowledge base can also be protected by the Secure DataServer. The Inference Engine does query modification as well as response processing.

We implemented the Inference Engine in "C" because of the C programming language interface that already exists for the Secure SQL Server. In the long-term, we envisage replacing such an Inference Engine with a more powerful logic-based theorem prover.

2.2.2 REPRESENTATION OF SECURITY CONSTRAINTS

We assume that the constraints are maintained by the SSO. Constraints themselves could be classified at different levels. However they are stored at system-high. The constraint manager, which is a trusted process, will ensure that a constraint classified at level L can only be read by a user cleared at level L or higher.

Figure 7:
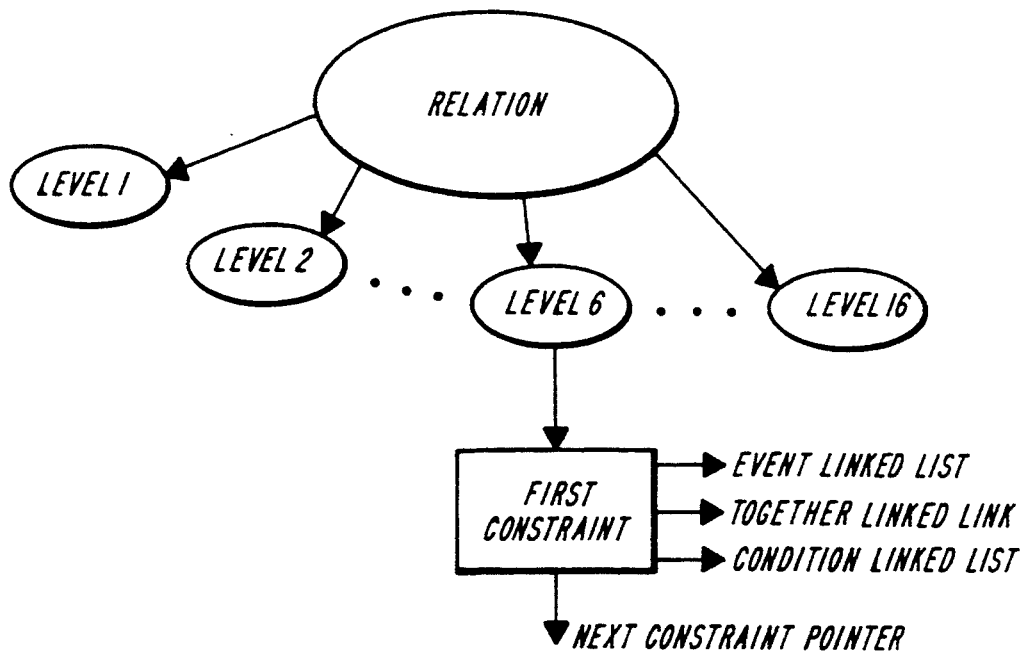
FIG. 7 is a schematic illustration of a constraint structure.

The constraints are entered in a format that is a simplified version of the rules that we described in section 1. The constraints entered by the SSO are then processed by a module of the Query processor and stored in a graphical structure. We found this an efficient way to represent the constraints. We have developed algorithms to scan the graph structure in order to obtain the relevant constraints during query processing. The algorithms also perform some optimization for efficiency. The graph structure is illustrated in FIG. 7. The relations are combined to form a linked list. Each relation has sixteen pointers emanating from it; one for each security level. Associated with each level is a lined list of constraints. Each constraint has a set of attributes that it classifies, constraint specific information such as events and conditions, and a pointer to the next constraint. Our implementation allows for the specification of events and conditions which are quite complex. Each constraint that is associated with a level classifies a set of attributes at that level.*

An alternate representation of constraint is discussed in section 5.

2.2.3 MODULES OF THE QUERY PROCESSOR

Figure 8:
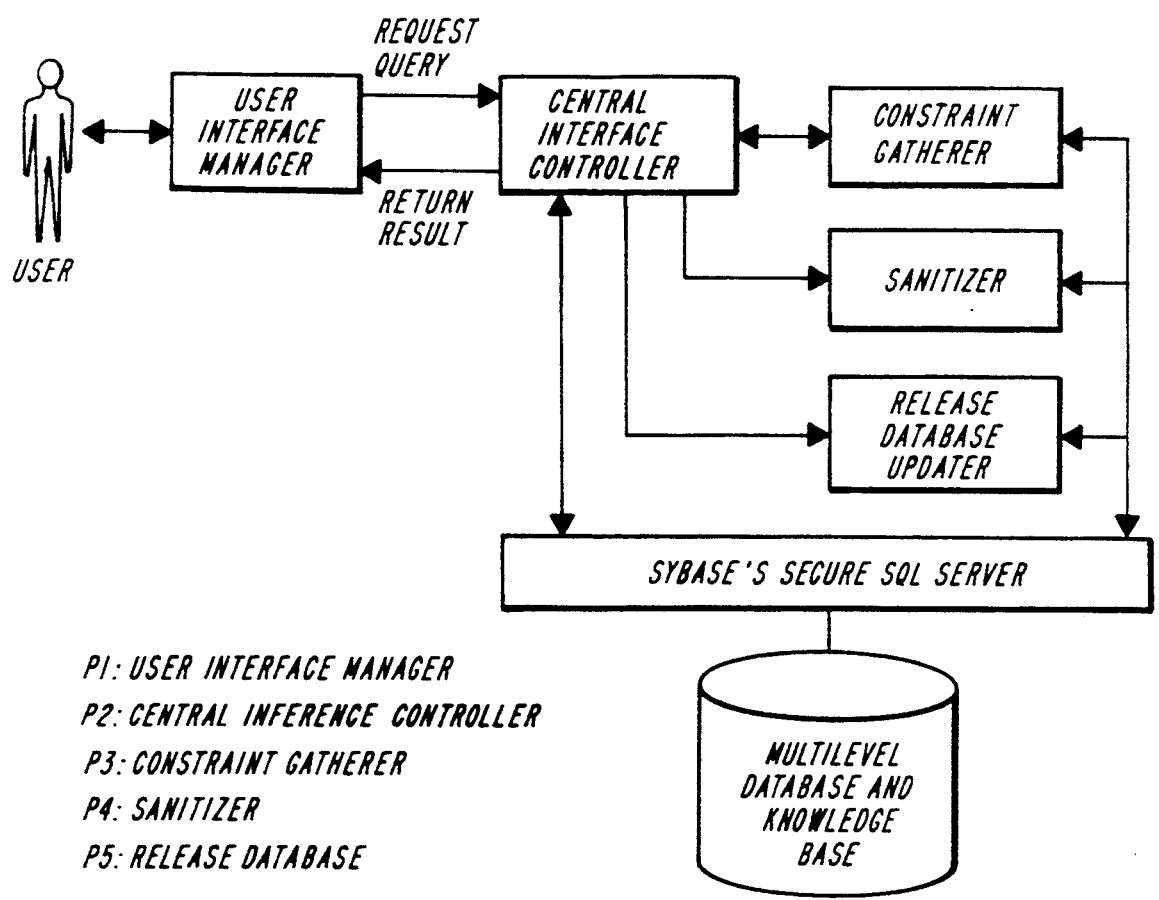
FIG. 8 is a schematic illustration of the major modules of the invention.

An overview of the major modules is shown in FIG. 8. The query processor consists of five modules P1 through P5. Each module is implemented as an Ultrix process.* The processes communicate with each other via the socket mechanism. A brief overview of the functions of each module is given below. We also identify the trust that must be placed on each process.

although operating system used in the implementation is not secure, our design assumes a the use of a multilevel secure operating system.

Process P1: The User Interface Manager

This process asks for password and security level from the user. Since we assume that the operating system is secure, we rely on the identification and authentication mechanism provided by the operating system. Due to this feature, P1 need not be a trusted process. It operates at the user's level. P1 accepts a query from the user and performs syntax check. It then sends the query to process P2 and returns the response received from P2 to the user. It then waits in idle state for a request from the user.

Process P2: The Central Inference Controller

This process first sets up communication with P1. It then waits in idle state for requests from P1. When a request arrives from P1, it logs into the database server at the user's level. It then requests process P3 (via socket) to return applicable constraints. The query is then modified based on the constraints (if any). The modified query is then sent to the MLS/DBMS. The response is then sent to process P4 for further processing. When P4 returns the sanitized response, a request is sent to process P5 to update the release database and the response is given to P1. P2 then returns to idle state. If constraints classified at a higher level are not processed by P3 or if the response from the MLS/DBMS is first given to P4 and P5 for sanitization and release database update, then P2 need not be a trusted processes. However, in our implementation, since P2 could have access to higher level information it must be trusted.

Process P3: The Constraint Gatherer

This process first sets up socket for communication with P2 and then logs into the database server at system-high. This is because P3 examines not only the security constraints classified at or below the user's level, but also higher level constraints. These higher level constraints are examined to ensure that by releasing a response at level L, it is not possible for users cleared at a higher level to infer information to which they are not authorized. P3 builds and maintains the constraint table whenever the constraints are updated. It waits in idle state for requests from P2. When a request arrives, it builds a list of applicable constraints and sends the constraint structure to P2 and then returns to idle state. Since P3 maintains the security constraints it is a trusted process.

Process P4: The Sanitizer

This process sets up socket for communication with P2 and logs into the database server at system high. It waits in idle state for a request to arrive from P2. When a request arrives, which consist of the response and the applicable release constraints, it sanitizes the response based on the information that has previously been released. It reads the release database maintained at various levels in order to carry out the sanitization process. It then returns the sanitized response to P2 and returns to idle state. Since response sanitization is a security critical function, P4 must be trusted.

Process P5: The Release Database Updater

This process sets up communication with P2. It waits in idle state for requests from P2. When a request arrives, it logs into the database server at all levels from system-high to the user's level and updates the release database at each level depending on the release constraints for that level. Note that this is necessary only if higher level constraints are examined by P3. If not, P5 can log into the database server only at the user's level. After each update to the release database, it logs out of the database server at each level. It returns a status message to P2 upon completion and returns to idle state.

2.2.5 GENERAL DISCUSSION

Over 8500 lines of C code have been implemented in the development of this prototype. We first developed the infrastructure of the query processor program. This involved the creation of the five processes and establishing the necessary communications between them. Some of these processes also had to log into Secure SQL Server at the appropriate security levels. The program was set up in such a way as to leave hooks for the easy addition of more features. Since this project is a preliminary prototype of a system which could conceivably be extended in the future, we have tried to continue this approach of flexibility and modularity to make further expansion of the program easier.

It appears that there is a noticeable performance degradation when individual release constraints are handled. Large amounts of data need to be recorded. There are possibilities for optimization and this will be part of our future work. From the experiments that we have carried out so far, the performance impact of handling all of the other constraints is marginal. That is, there is hardly any visible difference between the execution times of the query processing strategy with or without the query processor.

It should be noted that in our implementation we have assumed that the process P3 examines constraints not only classified at or below the user's level, but also the higher level constraints. That is, the higher level constraints have an impact on the query modification. From the responses received a user may be able to infer the constraints at the higher level. If on the other hand the higher level constraints are not processed by P3, the response may contain sensitive information. One way to overcome this problem is to analyze the constraints before they are enforced so that it is not possible for higher level constraints to have an impact on lower level query processing. More research needs to be done on constraint analysis.

2.3 TEST SCENARIOS

In this section we illustrate the processing of the query processor with some examples.

Let the database consist of two relations SHIPS and GROUPS. The attributes of SHIPS are Number, Name, Class, Date, and Assignment. Its primary key is Number. The attributes of GROUPS are Number, Location, Mission, and Siop. Its primary key is Number. We assume that SHIPS.Assignment and GROUPS.Number take values from the same domain. Also, SHIPS.Assignment is a foreign key. The database is populated as shown below. To simplify the discussion we assume that both SHIPS and GROUPS are assigned level 1. Furthermore, all of the tuples are also stored at level 1. Note that the usual DOD classification levels do not exist as such in the secure DBMS that we have used. We assume that the number I denotes the Unclassified level, the number 10 denoted the Secret level, and the number 16 (which is system-high) denoted the TopSecret level, and 10=secret, 16=top secret, i.e. system high. The user is assumed to be logged in at level 1. The table #filter temp 1 is a temporary work table used to store the result.

| | | Relation SHIPS | | |
|---|---|---|---|---|
| Number | Name | Class | Date | Assignment |
| CVN 68 | Nimitz | Nimitz | May 75 | 003 |
| CV 67 | John F Kennedy | John F Kennedy | Sep 68 | 001 |
| BB 61 | Iowa | Iowa | Feb 43 | 003 |
| CG 47 | Ticonderoga | Ticonderoga | Jan 83 | 005 |
| DD 963 | Spruance | Spruance | Sep 75 | 006 |
| AGF 3 | La Salle | Converted Raleigh | Feb 64 | 003 |
| WHEC 715 | Hamilton | Hamilton | Feb 67 | 003 |
| FFG 7 | Oliver Hazard Perry | Oliver Hazard Perry | Dec 77 | 001 |
| FF1052 | Knox | Knox | Apr 69 | 001 |
| LSD 36 | Anchorage | Anchorage | Mar 69 | 009 |
| LHA 1 | Tarawa | Tarawa | May 76 | 003 |
| MCM 1 | Avenger | Avenger | Sep 87 | 003 |
| AOR 1 | Whichita | Whichita | Jun 69 | 003 |
| AFS 1 | Mars | Mars | Dec 63 | 001 |
| AE 21 | Suribachi | Suribachi | Nov 56 | 009 |
| AE 23 | Nitro | Nitro | May 59 | 005 |
| AO 177 | New Cimarron | New Cimarron | Jan 81 | 001 |
| SSN 706 | Albuquerque | Los Angeles | May 83 | 006 |
| CVN 65 | Enterprise | Enterprise | Nov 61 | 009 |
| MSO 427 | Constant | Aggressive | Sep 54 | 001 |

| | | Relation Groups | |
|---|---|---|---|
| Number | Location | Mission | Siop |
| 001 | North Atlantic | naval exercises | 001 |
| 002 | South Atlantic | falklands patrol | 002 |
| 003 | Mediterranean | iraq crisis | 006 |
| 004 | Philippines | stabilize government | 005 |
| 005 | Persian Gulf | iraq crisis | 004 |
| 006 | Indian Ocean | naval exercises | 004 |
| 007 | North Sea | soviet reconnaissance | 003 |
| 008 | North Atlantic | oceanographic research | 003 |
| 009 | North Pacific | oceanographic research | 001 |

TEST SCENARIO 1: No Constraints
Constraints active: NONE
Original query: select * from Ships
User's level: 1
Final modified query: Same as the original query (that is, query is not modified)

select ships.number, ships.name, ships.class, ships.data, ships.assignment
into #filter_temp1 from ships
Note that the asterisk is a wildcard indicator which means the query is for all attributes (fields) in a record. When the Inference Engine sees this character it replaces it with all the field names in any tables specified in the from clause.
Result: All of the tuples in SHIPS TEST SCENARIO 2: Content constraints Constraints active:

ships.class = 'Belknap' → Level(ships.class) = 16;
ships.class = 'Ticonderoga' → Level(ships.class) = 16;
ships.class = 'Leahy' → Level(ships.class) = 16;
ships.class = 'Charles F Adams' → Level(ships.class) = 16;
ships.class = 'Ohio' → Level(ships.class) = 16;
ships.class = 'Spruance' → Level(ships.class) = 16;
ships.class = 'Iowa' → Level(ships.class) = 16;
ships.class = 'Aggressive' → Level(ships.class) = 16;
ships.class = 'Mars' → Level(ships.class) = 16;
ships.class = 'Nimitz' → Level(ships.class) = 16;
ships.class = 'Los Angeles' → Level(ships.class) = 16;
ships.class = 'John F Kennedy' → Level(ships.class) = 16;
ships.class = 'Enterprise' → Level(ships.class) = 16;
ships.class = 'Anchorage' → Level(ships.class) = 16;
Original query: select * from ships
User's level: 1
Final modified query:
select ships.number, ships.name, ships.class, ships.date, ships.assignment
into #filter temp1 from ships where
(not (ships.class = 'Belknap')) and
(not (ships.class = 'Ticonderoga')) and
(not (ships.class = 'Leahy')) and
(not (ships.class = 'Charles F Adams')) and
(not (ships.class = 'Ohio')) and
(not (ships.class = 'Spruance')) and
(not (ships.class = 'Iowa')) and
(not (ships.class = 'Aggressive')) and
(not (ships.class = 'Mars')) and
(not (ships.class = 'Nimitz')) and
(not (ships.class = 'Los Angeles')) and
(not (ships.class = 'John F Kennedy')) and
(not (ships.class = 'Enterprise')) and
(not (ships.class = 'Anchorage'))
Result:

| Number | Name | Class | Date | Assignment |
|---|---|---|---|---|
| AGF 3 | La Salle | Converted Raleigh | Feb 64 | 003 |
| WHEC 715 | Hamilton | Hamilton | Feb 67 | 003 |
| FFG 7 | Oliver Hazard Perry | Oliver Hazard Perry | Dec 77 | 001 |
| FF1052 | Knox | Knox | Apr 69 | 001 |
| LHA 1 | Tarawa | Tarawa | May 76 | 003 |
| MCM 1 | Avenger | Avenger | Sep 87 | 003 |
| AOR 1 | Whichita | Whichita | Jun 69 | 003 |
| AE 21 | Suribachi | Suribachi | Nov 56 | 010 |
| AE 23 | Nitro | Nitro | May 59 | 005 |
| AO 177 | New Cimarron | New Cimarron | Jan 81 | 001 |

TEST SCENARIO 3: Logical Constraints

Constraints active:
Logical(groups.location → groups.mission);
Level(groups.mission) = 16
Original query: select ships.name, groups.location, groups.siop from ships, groups where ships.assignment = groups.number
Final modified query:
select ships.name, groups.siop into #filter_temp1 from ships, groups where ships.assignment = groups.number
Results:

| Name | Siop |
|---|---|
| Nimitz | 006 |
| John F Kennedy | 001 |
| Iowa | 006 |
| Ticonderoga | 004 |
| Spruance | 004 |
| La Salle | 006 |
| Hamilton | 006 |
| Oliver Hazard Perry | 001 |
| Knox | 001 |
| Anchorage | 001 |
| Tarawa | 006 |
| Avenger | 006 |
| Whichita | 006 |
| Mars | 001 |
| Suribachi | 001 |

-continued

| | |
|---|---|
| Nitro | 004 |
| New Cimarron | 001 |
| Albuquerque | 004 |
| Enterprise | 001 |
| Constant | 001 |

TEST SCENARIO 4: Association Constraint (or Together Constraint)

constraints active:
Level(Together(groups.mission, groups.location)) = 10
Original query: select * from groups
User's level: 1
Final modified query:
select groups.number, groups.location, groups.siop into #filter_temp1 from groups
Results:

| Number | Location | Siop |
|---|---|---|
| 001 | North Atlantic | 001 |
| 002 | South Atlantic | 002 |
| 003 | Mediterranean | 006 |
| 004 | Philippines | 005 |
| 005 | Persian Gulf | 004 |
| 006 | Indian Ocean | 004 |
| 007 | North Sea | 003 |
| 008 | North Atlantic | 003 |
| 009 | North Pacific | 001 |

TEST SCENARIO 5: Content and Logical Constraints

Constraints Active:
Logical(Groups.Mission → Groups.Location)
Groups.Location = Persia Gulf → Level(Groups.Location) = 16
Original query: select * groups
Final modified query:
Select groups.number, groups.location, groups.mission, groups.siop into #filter_temp1 from groups where (not(groups.location = 'Persian Gulf'))

| Number | Location | Mission | Siop |
|---|---|---|---|
| 001 | North Atlantic | naval exercises | 001 |
| 002 | South Atlantic | falklands patrol | 002 |
| 003 | Mediterranean | iraq crisis | 006 |
| 004 | Philippines | stabilize government | 005 |
| 006 | Indian Ocean | naval exercises | 004 |
| 007 | North Sea | soviet reconnaissance | 003 |
| 008 | North Atlantic | oceanographic research | 003 |
| 009 | North Pacific | oceanographic research | 001 |

TEST SCENARIO 6: Release Constraint

Constraints active: Release(ships.assignment:1) → Level(ships.name) = 10
(i.e. if ships.assignment is released at level 1, then ships.name is classified at level 10)
Original query: select * from ships
User's level: 1
Results released previously were cleared before executing this query.
Release constraint triggered by the release of:
ships.assignment at level 1, ships.name can't appear in query.
Final modified query:
select ships.number, ships.class, ships.date, ships.assignment into #filter_temp1 from ships
Result:

| Number | Class | Date | Assignment |
|---|---|---|---|
| CVN 68 | Nimitz | May 75 | 003 |
| CV 67 | John F Kennedy | Sep 68 | 001 |
| BB 61 | Iowa | Feb 43 | 003 |
| CG 47 | Ticonderoga | Jan 83 | 005 |
| DD 963 | Spruance | Sep 75 | 006 |
| AGF 3 | Converted Raleigh | Feb 64 | 003 |
| WHEC 715 | Hamilton | Feb 67 | 003 |
| FFG 7 | Oliver Hazard Perry | Dec 77 | 001 |
| FF1052 | Knox | Apr 69 | 001 |
| LSD 36 | Anchorage | Mar 69 | 010 |
| LHA 1 | Tarawa | May 76 | 003 |
| MCM 1 | Avenger | Sep 87 | 003 |
| AOR 1 | Whichita | Jun 69 | 003 |
| AFS 1 | Mars | Dec 63 | 001 |
| AE 21 | Suribachi | Nov 56 | 010 |
| AE 23 | Nitro | May 59 | 005 |
| AO 177 | New Cimarron | Jan 81 | 001 |
| SSN 706 | Los Angeles | May 83 | 006 |
| CVN 65 | Enterprise | Nov 61 | 010 |
| MSO 427 | Aggressive | Sep 54 | 001 |

Release Table contents:

| Name | Level |
|---|---|
| ships.number | 1 |

-continued

| | |
|---|---|
| ships.class | 1 |
| ships.date | 1 |
| ships.assignment | 1 |

TEST SCENARIO 7: Aggregate Constraint

Constraints active: Aggregate(10) → Level(ships.name) = 12;
Original query: select * from ships
User's level: 1
Final query: Same as original query
select ships.number, ships.name, ships.class, ships.date, ships.assignment
into #filter_temp1 from ships
Result: No result returned for the query since more than 10 ship names would have been returned.

TEST SCENARIO 8: Aggregate Constraint

Constraints active: Aggregate(10) → Level(ships.name) = 12;
Original query: select * from ships where number like '% CV %'
final query as modified
select ships.number, ships.name, ships.class, ships.date, ships.assignment
into #filter_temp1 from ships were number like '% CV %'
Result:

| Number | Name | Class | Date | Assignment |
|---|---|---|---|---|
| CVN 68 | Nimitz | Nimitz | May 75 | 003 |
| CV 67 | John F Kennedy | John F Kennedy | Sep 68 | 001 |
| CVN 65 | Enterprise | Enterprise | Nov 61 | 010 |

3 DESIGN AND IMPLEMENTATION OF THE UPDATE PROCESSOR

3.1 OVERVIEW

MLS/DBMSs ensure the assignment of a security level to data as data is inserted or modified. The security level assigned to the data, however, is generally assumed to be the login security level of the user entering the data. A more powerful and dynamic approach to assigning security levels to data is through the utilization of security constraints, or classification rules, during update operations. This section provides an overview of the functionality and utilization of a tool, the Update Processor, that utilizes security constraints as its mechanism for determining the security level of data being inserted or modified. Descriptions of the security policy and of the types of security constraints addressed by the Update Processor are also included.

3.1.1 SECURITY POLICY

The security policy of the Update Processor is formulated from the simple security property in Bell, D., and L. La Padula, July 1975, "Secure Computer Systems: Unified Exposition and Multics Interpretation," Technical Report NTIS AD-A023588, The MITRE Corporation and from a security policy provided by our underlying MLS DBMS, SYBASE's Secure SQL Server. This policy is as follows:

1. All users are granted a maximum clearance level. A user may log in at any level that is dominated by his maximum clearance level. Subjects act on behalf of users at the user's login security level.
2. Objects are the rows, tables, and databases, and every object is assigned a security level upon creation.
3. A subject has read access to an object if the security level of the subject dominates the security level of the object.
4. A subject has write access to an object if the security level of the object dominates the security level of the subject.

Statements 3 and 4 of the policy presented above are the simple and *-property of the Bell and LaPadula policy. Since the Secure SQL Server by default polyinstantiates with updates, we are utilizing the more relaxed security policy offered by the Secure SQL Server. This less strict security policy is provided via the relaxation property option. The relaxation property does polyinstantiate with inserts, does not polyinstantiate with updates and allows users to delete tuples which their login security level dominates. More deraris on the security policy of the Secure SQL Server are provided in Rougeau, P., and E. Stearns, "The Sybase SEcure Database Server: A Solution to the Multilevel Secure DBMS Problem," Proceedings of the 10th National Computer Security Conference, Baltimore, Md., 1987.

3.1.2 FUNCTIONALITY OF THE UPDATE PROCESSOR

The Update Processor utilizes simple and content-dependent security constraints as guidance in determining the security level of the data being updated. The use of security constraints can thereby protect against users incorrectly labelling data as a result of logging in at the wrong level, against data being incorrectly labelled when it is imported from systems of different modes of operation such as a system high, and against database inconsistencies as a consequence of the security label of data in the database being affected by data being entered into the database.

The security level of an update request is determined by the Update Processor as follows. The simple and content-dependent security constraints associated with the relation being updated and with a security label greater than the user login security level are retrieved and examined for applicability. If multiple constraints apply, the security level is determined by the constraint that specifies the highest classification level. If no constraints apply, the update level is the login security level of the user. The Update Processor, therefore, does not determine the security level of the data solely from the security constraints, but utilizes the constraints as guidance in determining the level of the input data. The following examples illustrate the functionality of the Update Processor.

Consider a database that consists of a relation SHIPS whose attributes are number, name, class, date, and assignment, and number as its primary key. The content-based constraint which classifies all ships with name Georgia as secret is expressed as:

SHIPS.name="Georgia" →Secret.

A user at login security level confidential enters the following data to insert a tuple into the SHIPS relation:

Insert SHIPS values ("SSBN 729", "Florida", "Ohio", "Feb 84", "008"). The Update Processor will receive this insert and retrieve the constraints associated with the SHIPS relation which specify a level greater than the user level, which is confidential, and whose level is less than or equal to the user level. The content-based constraint stated above is retrieved. Since the data entered for the name field is not "Georgia", the security constraint associated with the SHIPS relation will not affect the classification level of the insert, and the Update Processor will determine the insert level to be the user level, which is confidential.

Suppose a user at login security level confidential then enters the following: Insert SHIPS values ("SSBN 730", "Georgia", "Ohio", "Mar 89", "009"). The Update Processor will again retrieve the content-based constraint associated with the SHIPS relation, which spedties a level greater than the user level and whose level is less than or equal to the user level. Since the data for the name field is "Georgia", the Update Processor will determine the insert level to be secret. If, however, the user entered this insert at login security level top secret, the Update Processor would perform the insert at the user level since the user level is higher than the level specified by the security constraint.

The update operation of the Update Processor functions similarly to the insert operation. As an example, suppose a user at the confidential level enters the follow: Update SHIPS set name="Georgia" where class="Ohio". the Update Processor will retrieve the security constraints associated with the SHIPS relation which specify a level greater than the user level and whose level is less than or equal to the user level. The content-dependent constraint stated above will be retrieved, an the Update Processor will determine the update level to be secret since the name field is being modified to "Georgia". The tuple with a primary key of "SSBN 729" as defined above will then be updated at the secret level, and the original tuple will be deleted.

In addition to describing the functionality of the Update Processor, the examples above illustrate the potential signaling channels that exist when operating with the Update Processor. A signaling channel is a form of covert channel which occurs when the actions of a high user or subject interfere with a low user or subject in a visible manner. Potential signaling channels occur when data is enter at a level higher than the user level and the user attempts to retrieve the data that he has entered, or when the Update Processor attempts to enter data at a higher level, but cannot since a tuple with the same primary key already exists at this level. We will discuss the potential signaling channels that could occur operating with the Update Processor and our solutions in Section 3.2.5.

3.1.3 UTILIZATION OF THE UPDATE PROCESSOR

An MLS DBMS provides assurance that all objects in a database have a security level associated with them and that users are allowed to access only the data which they are cleared. Additionally, it provides a mechanism for entering multilevel data but relies on the user to login at the level at which the data is to be entered. The Update Processor will provide a mechanism that can operate as a standalone tool with a MLS DBMS to provide assurance that data is accurately labelled as it is entered into the data base. This could significantly enhance and simplify the ability of an MLS DBMS to assure that data entered via bulk data loads and bulk data updates is accurately labelled.

Another significant use for an Update Processor is in operation with an Query processor which functions during query processing. The Query processor protects against certain security violations via inference that can occur when users issue multiple requests and consequently infer unauthorized knowledge. The Query processor Prototype also utilizes security constraints as its mechanism for determining the security level of data. The security constraints are used as derivation rules as they are applied to the data during query processing. Addressing all of the security constraint types mentioned above could add a significant burden to the query processor particularly if the number of constraints is high. To enhance the performance of the query processor, the Update Processor can be utilized to address certain constraint types as data is entered into the database, in particular, simple and content-based constraints, alleviating the need for the query processor to handle these constraint types. We assume that the security constraints remain relatively static, as reliance on the Update Processor to ensure that data in the database remains consistent would be difficult, particularly in a volattic environment where the constraints change dynamically. An additional concern is that database updates could leave the database in an inconsistent state. The Update Processor, however, is designed to reject updates that cause a rippling effect and thus leave the database in an inconsistent state.

3.2 DESIGN AND IMPLEMENTATION

3.2.1 REPRESENTATION OF SECURITY CONSTRAINTS

The Update Processor handles the simple and content-based constraints. While the graph structure representation discussed in section 4 was efficient for a small number of constraints, we felt that it would be more efficient to store a large number of constraints in the database. Therefore, for the update processor prototype we decided to store the constraints in the database. As before the constraints were classified at different security levels, but stored at system-high. The owner of the constraint table is the SSO. Therefore only the SSO can manipulate the constraint table. The constraint manager, which is a trusted process, would ensure that only a user classified at level L could read the constraints classified at or below level L.

TABLE 1

| | | CONSTRAINT Table | | |
|---|---|---|---|---|
| C_ID | C_LEVEL | RESULT_REL_NAME | CONDITION | RESULT_LEVEL |
| 1 | 6 | class = "Georgia | 10 | SHIPS |
| 2 | 6 | name = "Florida" | 11 | SHIPS |
| 3 | 6 | name = "Georgia" | 12 | SHIPS |
| 4 | 6 | 1 = 1 | 8 | SHIPS_CLASS |

The CONSTRAINT table, populated with example constraints, is presented in Table 1. The definition of the field names follows. CONSTRAINT. c_id is the primary key for the table and contains a unique constraint identifier. CONSTRAINT.c_level is the constraint level. Only data entered by users with a login security level at or above this constraint level will be affected by this constraint. CONSTRAINT.result_rel_name_id is the relation name associated with the constraint. CON- STRAINT.condition is the expression of the condition for a content-based constraint, and CONSTRAINT.result_evel is the level specified by the constraint. An additional field which we recommend adding to the CONSTRAINT table is a CONSTRAINT.status field to indicate whether the constraint is currently active or inactive. The capability to change the status of constraints is particularly useful for an application whose constraints change dynamically.

3.2.2 ASSUMPTIONS

In implementing the Update Processor, the following assumptions were made. Examples are given for clarification when necessary.

1. Users can only update tuples they can see. If a user updates a tuple that exists at his login security level and the Update Processor determines the update security level to be higher than the user's login security level, the Update Processor will perform the update at this higher level. However, if a tuple with the same primary key already exists at this higher level, the update request will be rejected, as the user would in fact be updating a tuple whose security label is greater than his login security level. The Update Processor will return a request failed message to the user. We recommend that a request of this type be audited and that an SSO be alerted to resolve the conflict.

2. An update request will be aborted if it leaves the database in an inconsistent state. This may occur with the existence of more complex constraints on multiple relations. As an example: Given the constraint which references the SHIPS and SHIPS_CLASS tables, SHIPS CLASS.length="20"→Level (SHIPS.name)=9. If the SHIPS CLASS.length field is updated to be equal to "20," then data in the SHIPS table where SHIPS_CLASS.classification=SHIPS.class and SHIPS CLASS.length="20" may be labelled inaccurately. An update of this type that will leave the database in an inconsistent state will be aborted.*

*We have designed techniques to handle such inconsistencies. These techniques have not yet been implemented.

3. If a user requests an update at a login security level that is higher than the level determined by the Update Processor, the SSO will examine the request and, if acceptable, will allow the update to be executed at the user level. The Update Processor thereby allows for the overclassification of data.

4. The Update Processor operates with the more relaxed security policy provided by SYBASE's relaxation property option. Operating with this option alleviates the need for the Update Processor to delete the original lower-level tuple when updating a tuple to a higher level since polyinstantiation is not supported with updates.

3.2.3 ALGORITHM FOR ASSIGNING SECURITY LEVELS TO DATA

Insert Request

The algorithm used by the Update Processor to determine the security level of data being inserted is as follows. Once an insert request is received, the request is parsed to retrieve the relation name. The Update Processor then searches the CONSTRAINT table for all constraints where CONSTRAINT. result_rel_name equals the relation name in the request, where the CONSTRAINT.c_level is less than or equal to the user login security level, and where the CONSTRAINT.result_level is greater than the user login security level. The applicable constraints are then ordered in descending order by CONSTRAINT.result_level. The constraints are ordered as such to alleviate the need to examine all the constraints. The CONSTRAINT.result_level of the first constraint that applies will be the insert level determined by the constraints. Following the retrieval from the CONSTRAINT table, the initial insert request is inserted into an empty temporary table. A select statement is then built using the temporary table as the relation and the condition from the first applicable constraint as the where clause. If this select statement successfully retrieves the row in the temporary table, then the constraint applies. The CONSTRAINT.result level for this constraint is the level at which the Update Processor will request the insert to the Secure SQL Server.

If, however, the select statement does not retrieve the row in the temporary table, the temporary table is deleted, and the algorithm repeats for the next applicable constraint. If the algorithm complete and no constraints apply, then the insert level is determined to be the user login security level.

An example of the insert algorithm is as follows. Consider the following insert requested by a user at login security level 6 on the ships database that has defined to it the constraints as specified in the CONSTRAINT table in Table 1:

insert SHIPS values ("SSBN 730", "Georgia", "Ohio", "Feb 84", "009").

Three constraints are retrieved from the CONSTRAINT table in the order CONSTRAINT.c_id="3", CONSTRAINT.c_id="2", CONSTRAINT.c_id="1". The insert request is then modified to allow the data to be inserted into an empty temporary table that has the same schema as the SHIPS table. The temporary table, #insert_temp,is created using SQL as follows: select * into #insert_temp from rel_name where 1=2, where rel_name is the relation name of the insert request. The data is then inserted into the temporary table with the following insert request:
insert #insert_temp values ("SSBN730", "Georgia", "Ohio", "Feb 84", "009").

Next, a select statement is built from the CONSTRAINT.condition data for CONSTRAINT.c_id="3" and this temporary table. The select statement is:

select * from #insert_temp where name="Georgia".

Since this select statement successfully retrieves the one tuple in the temporary table, this constraint applies, and the insert level is determined to be 12, which the CONSTRAINT.result_level for this constraint. Although the other constraints may apply, the CONSTRAINT.result_level for these constraints is less than 12, so it is not necessary to examine them.

Update Request

The algorithm used by the Update Processor to determine the security level of data being updated is as follows. The request is parsed to retrieve the relation name. The Update Processor then searches the CONSTRAINT table, as it does for an insert request, for all constraints where CONSTRAINT.result_rel_name equals the relation name in the request, where the CONSTRAINT.c_level is less than or equal to the user login security level and where the CONSTRAINT.result_level is greater than the user login security level. The application constraints are then ordered in descending order by CONSTRAINT.result_level. Following the retrieval from the CONSTRAINT table, a temporary table is created with tuples from the relation in the update request that satisfy the where clause in the update request. This temporary table is then utilized as it was for an insert request, i.e., as a mechanism to check if the constraints selected from the CONSTRAINT table apply. Select statements are built using the temporary table as the relation and the condition from the first applicable constraint as the where clause. If the select statement successfully retrieves any rows from the temporary table, then the constraint applies. The CONSTRAINT.result_level for this constraint is the level at which the Update Processor will request the update to the Secure SQL Server.

As with an insert request, if the select statement does not retrieve any rows in the temporary table, the temporary table is deleted, and the algorithm repeats for the next applicable constraint. If the algorithm completes and no constraints apply, the update level is determined t be the user login security level.

The following example illustrates the algorithm for update requests. Consider the update request by a user at login security level 6 on the SHIPS table which contains the tuple ("SSBN 728", "Lafayette", "Lafayette", "Jun 83", "009") and operates with constraints as defined in Table 1:
update SHIPS set name="Florida" where name='- 'Lafayette".

Three constraints are retrieved from the CONSTRAINT table in the order CONSTRAINT.-c_id="3", CONSTRAINT.c_id="2", CONSTRAINT.c_id —"1".

A select statement is then bufit that selects into a temporary table the tuples that satisfy the condition "where name="Lafayette", which is the where clause of the update request. The select statement is: "select * into #update_temp from SHIPS where name="Lafayette" and see_label =convert(binary,user_see_label), where the test for the security label ensures that only tuples less than or equal to the user security label are selected since the process that performs this operation runs at system high. Once the temporary table is built, the update request is modified to update the temporary table. Then, the select statement is built using the where clause of the first applicable constraint as follows:
"select * from #update_temp where name="Georgia"

Since this select statement does not retrieve any rows from the temporary table, the temporary table is deleted, and the algorithm repeats for the next constraint. The next constraint, SHIPS.name="Florida"= = Level(SHIPS)=11, will apply, and the update level will be 11. The following subsection will describe details of the implementation design of the Update Processor.

3.2.4 MODULES OF THE UPDATE PROCESSOR

Figure 9:
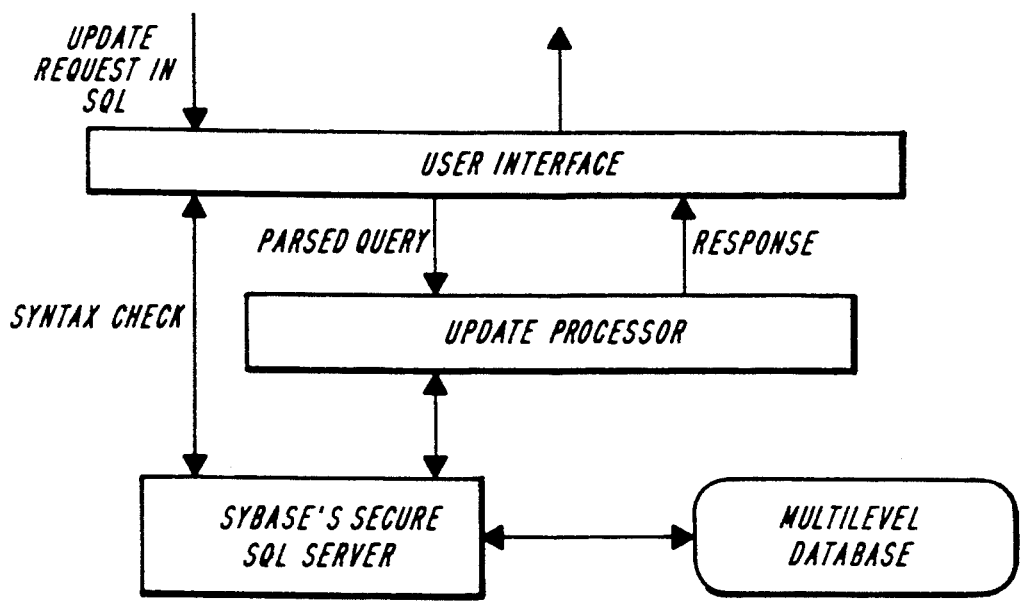
FIG. 9 is a block diagram illustrating another high-level architecture.

A high-level architecture for the Update Processor prototype is provided in FIG. 9. A brief description for data flow within the prototype is as follows: the User Interface* accepts a user's input and sends the input to the Secure SQL Server for a syntax check. If the syntax is correct, the user interface routes the input to the Update Processor. The Update Processor accepts the input, determines the inert/update security level for the input using the security constraints as a guideline, and establishes a connection to the Secure SQL Server at the determined security level for execution of the transaction. The Update Processor then sends a message back to the User Interface indicating the completion status of the transaction.
Minor changes were made to the user interface of the query processor for use by the Update Processor Prototype. This User Interface was utilized to provide a common interface for the Update Processor Prototype and the Query Processor Prototype.

Figure 10:
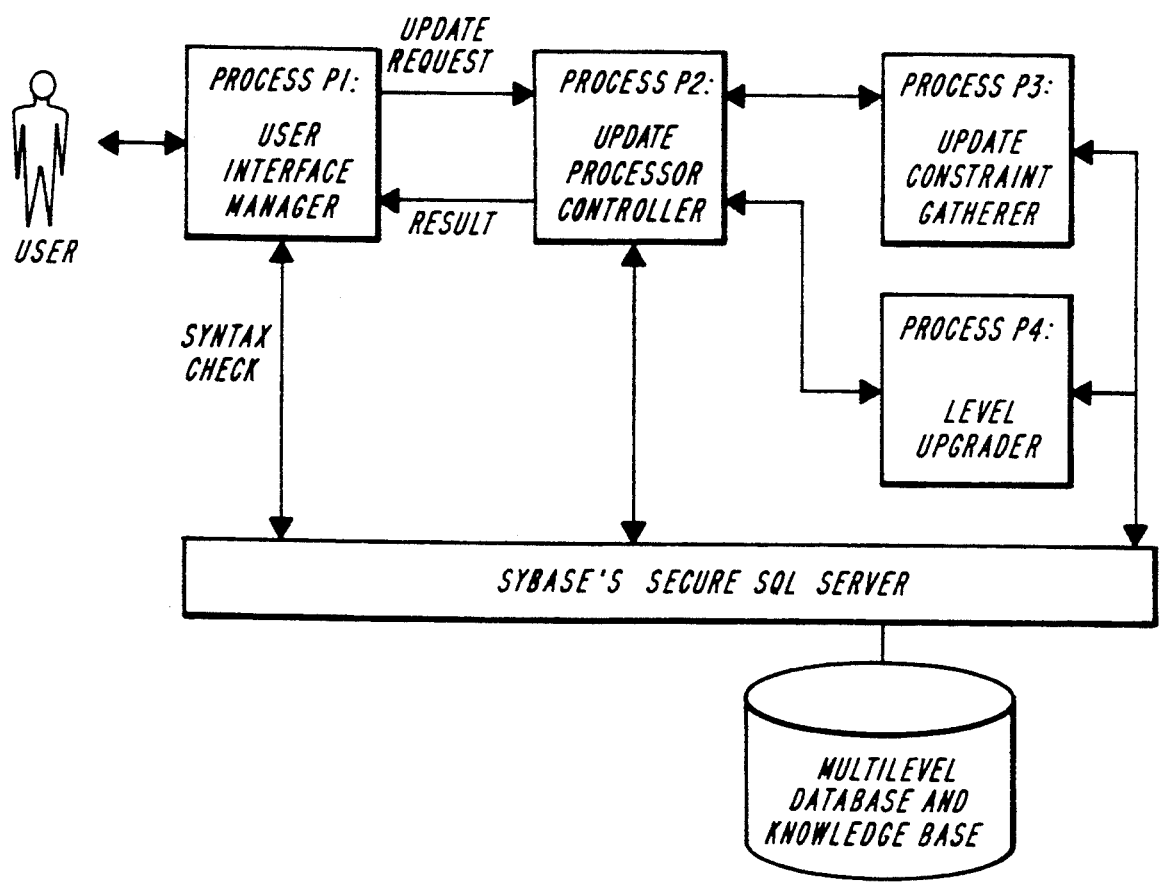
FIG. 10 is a block diagram illustrating the implementation architecture according to the invention.

A more detailed presentation of the design of the Update Processor is in FIG. 10. This figure provides an overview of the modules that comprise the Update Processor. The Update Processor is modularized by function and by the security level at which the function is required to operate. Each module is implemented as an ULTRIX process, and process communication is via sockets. The underlying TCB must provide a reliable interprocess communication (IPC) mechanism for communication. A description of the functions of these modules is provided below. With is description is a discussion on the security level at which these processes run and whether they are trusted or untrusted processes.

The update Processor employs a process structure similar to the Query processor to allow for integration with the Query processor Prototype.

Process P1 provides a similar user interface to process P1 of the Query processor Prototype. Additionally, the functionality of process P2 could be integrated with the functionality of process P2 of the Query processor Prototype. However, processes P3 and P4 of the Update Processor must not be confused with processes P3 and P4 of the Query processor Prototype. Processes P3 and P4 are specific t the Update Processor. Should the Update Processor Prototype be integrated with the Query processor Prototype, processes P3 and P4 of the Update Processor must remain unique processes.

Process PI: User Interface Manager

The User Interface Manager process, process P1, provides a user interface to the Update Processor prototype. At start-up, P1 prompts the user for a password and security level. The level specified by the user is the level at which this process runs. Next, P1 prompts the user for a database request and remains in idle until it receives a request. Upon receiving a request, P1 logs into the Secure SQL Server using the user's userid, password, and clearance. The request is then sent to the server for a syntax check. The server returns a message indicating the result of the syntax check. If successful, communication is established with process P2, the Update Processor Controller, and the request, along with the login packet that contains the userid, login security level, and password of the user, is routed to P2. P1 then remains waiting for a response which will indicate the success or failure of the transaction from P2. Once a response is received from P2, P1 will display the response to the user, and P1 will again prompt the user for another request. If the user chooses to enter a request at a different login security level, process P1 will have to be restarred, at which point the user will again be prompted for a password and clearance.

The User Interface Manager operates as the front-end to the Update Processor and does not perform security-critical operations. By design, it is isolated from the operations of the higher level processes. As a result, P1 is an untrusted process and, as mentioned above, operates at the user's level.

Process P2: Update Processor Controller

The Update Processor Controller manages the flow of information between the Update Constraint Gatherer (process P3), the Level Upgrader (process P4), and the Secure SQL Server in determining the level of the update and in performing the update. Upon start-up, P2 idles, waiting for a request for P1. Upon receiving the login packet and the request, P2 logs into the Secure SQL Server utilizing the userid, password, and clearance in the login packet. Thus, P2 runs at the user level. The Update Processor controller then examines the request to determine if it is a select, an insert, an update, or a delete. If the request is an insert or an update, some preliminary processing is performed on the request, and the request along with the login packet is sent to P3. P2 remains idle, waiting for a response which will contain the insert/update level from P3. If the level determined by P3 is greater than the user level, P2 invokes P4 to perform the insert/update level from P3. If the level determined by P3 is greater than the user level, P2 invokes P4 to perform the insert/update. P2 then idles, waiting for a successor or failure response from P4. If the level determined by P3 is the user level, then P2 sends the request to the Secure SQL Server to perform the inserff/update. The Secure SQL Server returns a completion status message to P2, indicating whether the transaction completed or failed. P2 then sends this completion status message to P1 and waits for the next request from P1.

The Update Processor Controller provides assurance that the connection to the Secure SQL Server is established at the correct level, that the user's request is not modified, and that the level determined by P3 is either the level at which the update is performed or the level sent to P4. As such, the Update Processor Controller is a trusted process.

Process P3: Update Constraint Gatherer

The Update Constraint Gatherer is responsible for determining the security level of the data utilizing the applicable security constraints. Since P3 must have access to the constraints that are stored in the CONSTRAINT table, which is defined at system high, P3 runs a system high. At start-up, P3 waits for a request from P2. Upon receiving a request, P3 determines the security level of the insert or update, utilizing the algorithms described above. P3 then sends this level to P2 and idles, waiting for another request.

Since the Update Constraint Gatherer determines the level at which the insert/update will be performed, assurance must be provided that the applicable constraints are used and that the level determined by this process is accurate. This process, therefore, is a trusted process.

Process P4: Level Upgrader

The Level Upgrader is the process that issues the request to the Secure SQL Server at the level determined by P3 when the insert/update level determined by P3 is greater than the user level. (Note: P2 runs at the user level.) At start-up, P4 wait for a request from P2. Upon receiving the level from P2, P4 logs into the Secure SQL Server at this level and sends the request to the server. The response from the server is examined, and the completion status message is sent to P2. P4 then idles, awaiting another request from P2.

The Level Upgrader provides assurance that the level at which it requests the Secure SQL Server to perform the insert/update is the level received from P2. P4 is therefore a trusted process.

3.2.5 GENERAL DISCUSSION

In this section we provide a general discussion on the prototype implemented. Approximately 2500 lines of C code was implemented for the Update Processor. As mentioned earlier, the Update Processor has the ability to analyze a user's insert/update request, determine the security level of the data to be inserted/updated utilizing security constraints, and ensure that the data is inserted/updated at the determined level. The Update Processor can ensure that data is accurately labelled when a user enters data while logged in at the wrong level, when data is imported from systems of different modes of operation, such as a system high, or when the security level of data in the database is affected by data being entered into the database.

As discussed previously, in addition to operating as a standalone tool, the Update Processor has been designed to operate with the Query processor Prototype. As such, some of the burden placed on the Query processor can be alleviated since the simple and content-based constraints can be addressed by the Update Processor. Operating inn an environment where users both query and update the database, however, allows for the occurrence of potential signaling channels. As an example, in some cases the user cannot retrieve the data he has entered. Since the security levels of the security constraints that determined the security level of the input is not at a level higher than the user level, i.e., the value of CONSTRAINT.c level for constraints used during update processing is the user level, we do not regard this as a signaling channel. The data in the CONSTRAINT table is labelled at system high to allow an SSO to maintain the table,* but the CONSTRAINT.c level value reflects the true level of the constraint. Therefore, if the constraint level, which is the value of CONSTRAINT.c level, is at or below the user level, we assume it is not the action of a high-level user or subject that is interfering with the result.

SYBASE requires an SSO to be logged in at system high to have access to SSO functions.

Another significant consideration with the Update Processor operating with the Query processor Prototype is the content of error messages. The content of some of the Secure SQL Server's error messages, coupled with the ability to query the database, may enable a user to infer something about the security level of his insert/update. As an example, if it is determined that an insert request should be processed at a higher level, and if a tuple with the same primary key already exists at the higher level, then a message that indicates that a duplicate key row already exists is sent by the Secure SQL Server to the Level Upgrader. If this message were routed to the User Interface Manager, the user could infer that the data he entered exists at a higher level. Furthermore, he could infer that the data exists at a higher level either because it was input by a user at a higher level or because a security constraint exists that determined the insert level to be so. Through experimenting with additional inserts, the user could determine the existence of this security constraint. Our solution is to have the Level Upgrader interpret this error message to be a request failed message. A request failed message is then sent to the Update Processor controller, who in turn sends it to the User Interface Manager that displays it to the user. The user, therefore, is only aware that the request failed. To further resolve this confusion for the user, we recommend that transactions of this type be audited and that the SSO be alerted to provide an explanation to the user if needed.

Performance is an additional concern with the Update Processor. The response time of the Query processor may improve with the use of the Update Processor, but the response time for updates will be affected. This, however, is acceptable for an application whose percentage of retrievals exceeds that of updates. Additionally, should this functionality be incorporated into MLS DBMS, the effect on performance may not be significant since this functionality could exist as part of the DBMS kernel rather than as a user application as it currently exists. Regardless, we project that since the performance of updates, in general, is not quite as critical as the performance of retrievals, the benefits from implementing this security functionality should outweigh the projected minimal loss in performance.

In general, the Update Processor provides functionality which is desirable in a multilevel operating environment. The nature of the tool allows for it to operate as a standalone tool or in conjunction with a Query processor. Additionally, this functionality could easily be adapted to operate with an existing MLD DBMS to enhance its security features.

3.3 TEST SCENARIOS

This section illustrates the functionality of the Update Processor. Included in this section is a description of our test database and our test scenarios. With each test scenario is a statement of input, the significance of the test, and the results of the test. Each scenario uses our test database, the ships database, and each scenario is to be executed by a user at login security level 6.

3.3.1 TEST DATABASE

Our test database is the ships database. The ships database and all the relations in this database have been defined at level 1. The test database will initially be empty and will not be reinitialized with each scenario so the reader can see the results of utilizing the Update Processor as each transaction completes, as this is how it would operationally be used.

All of our example transactions are against the SHIPS and SHIPS CLASS relations which have been defined below.

```
create table SHIPS
   (number varchar(10),
    name varchar(22),
    class varchar(22),
    date varchar(8),
    assignment varchar(10))
unique index: number
   create table SHIPS CLASS
      (classification varchar(50),
       length varchar(50),
```

```
       disp varchar(7),
       speed varchar(4),
       missile varchar(15),
       torpedo varchar(15),
       gun varchar(15))
unique index: classification
```

As mentioned in section 3.3, each user database must contain a CONSTRAINTS table to store the simple and content-based security constraints used by the Update Processor. The following four constraints are active for these tests.

1. SHIPS.class="Ohio"→Level (SHIPS)=10;
2. SHIPS.name="Florida"→Level (SHIPS)=11;
3. SHIPS.name="Georgia"→Level (SHIPS)=12;
4. →Level (SHIPS_CLASS)=8;

3.3.2 TEST SCENARIOS

TEST SCENARIO 1: insert SHIPS values ("SSBN 728", "Lafayette", "Lafayette", "Jun 83", "009")

This scenario exemplifies an insert transaction that is not affected by the security constraints, since the value for SHIPS.class is not "ohio", and SHIPS.name is not "Florida" or "Georgia". The following response to the SQL select statement demonstrates the results of this transaction.

```
1>select sec_label, *from SHIPS
2>go
```

| sec_label | number | name | class | date | assignment |
| --- | --- | --- | --- | --- | --- |
| 0x06000000000000000000000000 | SSBN 28 | Lafayette | Lafayette | Jun 83 | 009 |

The results indicate that the tuple was not affected by the security constraints and was inserted at the user level which is level 6.

TEST SCENARIO 2:

Insert SHIPS values("SSBN 729", "Florida",'-'Lafayette',"Jun 83","09"))

This scenario exemplifies an insert transaction that is affected by security constraint 2. The Update Processor actually retrieves the three security constraints associated with the SHIPS relation and examines them in descending order by constraint security level. As a result, security constraint 3 is examined, followed by security constraint 2. The following retrieval demonstrates the results of this transaction.

```
1>select sec_abel, *from SHIPS
2>go
```

| sec_label | number | name | class | date | assignment |
| --- | --- | --- | --- | --- | --- |
| 0x06000000000000000000000000 | SSBN 728 | Lafayette | Lafayette | Jun 83 | 009 |

This result does not indicate that the tuple was inserted. However, the Update Processor returned a successful response to the user. The user, therefore, will assume that either his tuple has since been deleted or that it was inserted at a level higher than his login security level. The following response, submitted by a user at login level 16, demonstrates the results of this transaction.

```
1>select sec_label, *from SHIPS
2>go
```

| sec_label | number | name | class | date | assignment |
| --- | --- | --- | --- | --- | --- |
| 0x06000000000000000000000000 | SSBN 728 | Lafayette | Lafayette | Jun 83 | 009 |
| 0x0b000000000000000000000000 | SSBN 729 | Florida | Lafayette | Jun 83 | 009 |

This response indicates that the tuple was inserted at level 11 since security constraint 2 was satisfied.

TEST SCENARIO 3:

Insert SHIPS values("SSBN 730","Georgia","Ohio","Feb 84","009")

This scenario exemplifies an insert transaction that is affected by more than one security constraint. The Update Processor retrieves the three security constraints associated with the SHIPS relation in descending order by constraint security level. However, the condition from security constraint 3 is satisfied, so that the insert level is determined to be 12, ad the remaining constraints are not examined. The following response, submitted by a user at login level 16, demonstrates the results of this transaction. A user logged in at level 6 would retrieve only the tuple with number="SSBN 728".

1>select sec_label, *from SHIPS
2>go

| sec_label | number | name | class | date | assignment |
|---|---|---|---|---|---|
| 0x060000000000000000000000 | SSBN 728 | Lafayette | Lafayette | Jun 83 | 009 |
| 0x0b0000000000000000000000 | SSBN 729 | Florida | Lafayette | Jun 83 | 009 |
| 0x0c0000000000000000000000 | SSBN 730 | Georgia | Ohio | Jun 85 | 006 |

TEST SCENARIO 4:
Update SHIPS set name="Florida" where name='-'Lafayette"

This scenario exemplifies an update transaction that is affected by a security constraint. Without utilizing the Update Processor, this transaction would result in the modification to the name field in the tuple with number="SSBN 728". This tuple exists at level 6 which is the user's login security level. Utilizing the Update Processor, however, the name field will be modified as well as the classification level. Since the name is being set for "Florida", security constraint 2 will determine the update security level to be 11. The tuple will then be inserted at level 11, and the original tuple will be deleted, as we are running with the relaxation property on. The following response, submitted by a user at login level 16, demonstrates the results of this transaction. A user logged in at level 6 would not have access to the data currently in the SHIPS table.

1>select sec_label, *from SHIPS
2>go

| sec_label | number | name | class | date | assignment |
|---|---|---|---|---|---|
| 0x0b0000000000000000000000 | SSBN 729 | Florida | Lafayette | Jun 83 | 009 |
| 0x0c0000000000000000000000 | SSBN 730 | Georgia | Ohio | Jun 85 | 006 |
| 0x0b0000000000000000000000 | SSBN 728 | Florida | Lafayette | Jun 83 | 009 |

TEST SCENARIO 5:
Insert SHIPS values("SSBN 729","Florida",'-'Lafayette","June 83","09")

This scenario exemplifies an insert transaction that will result in a duplicate key row. When a user logged in at level 6 queries the database, he will not retrieve the duplicate tuple at level 11. When this tuple is inserted, the Update Processor will determine that the insert level is level 11, will attempt to insert it at level 11, and will receive a message from the Secure SQL Server that a duplicate key row already exists. The Update Processor will then send a message to the user that the transaction failed. It would then be the responsibility of the SSO to resolve this situation with the user.

TEST SCENARIO 6:
Insert SHIPS values("SSBN 728","Lafayette",'-'Lafayette","Jun 83","009")

This scenario exemplifies an insert transaction that will result in a tuple being inserted at the user level, level 6, followed by an update operation that will be aborted, since it will result in a duplicate key row. The following tuples reside in the database after the above transaction is executed. The following response, submitted by a user at login level 16, demonstrates the results of this transaction.

1>select sec_label, *from SHIPS
2>go

| sec_label | number | name | class | date | assignment |
|---|---|---|---|---|---|
| 0x0b0000000000000000000000 | SSBN 729 | Florida | Lafayette | Jun 83 | 009 |
| 0x0c0000000000000000000000 | SSBN 730 | Georgia | Ohio | Jun 85 | 006 |
| 0x0b0000000000000000000000 | SSBN 728 | Florida | Lafayette | Jun 83 | 009 |
| 0x060000000000000000000000 | SSBN 728 | Lafayette | Lafayette | Jun 83 | 009 |

Following, the update transaction:
Update SHIPS set name="Florida" where name='-'Lafayette" is executed. The Update Processor will determine the update level to be 11, since security constraint 2 is satisfied, and will attempt to execute this update at level 11. The server will abort this request and return a message indicating that a duplicate key row already exists. The Update Processor will then send a message to the user that the transaction failed. It would then be the responsibility of the SSO to resolve this situation with the user.

TEST SCENARIO 7:
Insert SHIPS_CLASS values("Ohio","Nuclear","17","187","20","tri I","Mk 68")

This scenario exemplifies an insert transaction that is affected by security constraint 4. Security constraint 4 is a simple constraint that specifies that all data in the relation SHIPS_CLASS will be at level 8. Therefore, the Update Processor will determine the insert level to be level 8. The following response demonstrates the results of this transaction.

1>select sec_label, *from SHIPS
2>go

| sec_label | name | classification | length disp |
|---|---|---|---|
| 0x0c0000000000000000000000 | Ohio | nuclear | 17 |
| (Attributes Continued) | speed | missile | torpedo | gun |
| | 187 | 20 | Tri I | Mk68 |

4. HANDLING SECURITY CONSTRAINTS DURING DATABASE DESIGN

4.1 OVERVIEW

The main focus of this section is a discussion on how association-based constraints (also called together or context-based constraints) could be handled during database design. We then briefly discuss how simple constraints as well as logical constraints could be handled.

An association-based constraint classifies a collection of attributes taken together at a particular security level. What is interesting about the association-based constraint is that it can generate several relationships between the various attributes. For example, if there is a relation SHIPS whose attributes are S#, SNAME, and CAPTAIN, and if an association-based constraint classifies the SNAME and CAPTAIN taken together at the Secret level, then one of the pairs (S#, SNAME), (S#, CAPTAIN) should also be classified at the Secret level. Otherwise, an Unclassified user can obtain the (S#, SNAME0 and the $3, CAPTAIN) pairs and infer the Secret association (SNAME, CAPTAIN). There has been much discussion in the literature as to the appropriate place to handle these association-based constraints. Some argue that they should be handled during database design Lunt, T., May 1989, "Inference and Aggregation, Facts and Fallacies," Proceedings of the IEEE Symposium on Security and Privacy, Oakland, Calif. while others argue that they should be handled during query and update processing Stachour, P., and B. Thuraisingham, June 1990, "Design of LDV—a Multilevel Secure Relational Database Management System," IEE Transactions on Knowledge and Data Engineering, Volume 2, No. 2. However, none of the work reported so far studied the properties of these association-based constraints, nor has it provided any technique to generate the additional association-based constraints that can be deduced from an initial set of association-based constraints.

We first describe an algorithm which processes a given set of association-based constraints and outputs the schema for the multilevel database. Given a set of association-based constraints and an initial schema, the algorithm will output clusters of attributes and the security level of each cluster. We then prove that the attributes within a cluster can be stored securely at the corresponding level. A tool based on this algorithm can help the systems security officer (SSO) design the multilevel database. The algorithm that we have designed does not necessarily have to be executed during database design only. It can also be executed during query processing. That is, the query processor can examine the attributes in the various clusters generated by the algorithm and then determine which information has to be released to the users. For example, if the algorithm places the attribute A1, A2 in cluster 1 at level L, and the attributes A3, A4 in cluster 2 at level L, then, after an attribute in cluster 1 has been released to a user at level L, none of the attributes in cluster 2 can be released to users at level L.

Since simple constraints can be regarded as a special form of association-based constraints, where only one attribute is classified, we feel that such constraints could also be handled during database design. Another constraint that could be handled during database design is the logical constraint. For example, if attribute A implies an attribute B, and if attribute B is classified at the Secret level, then attribute A must be classified at least at the Secret level. It should be noted that if any of the constraints have conditions attached to them, then handling them during database design time would be difficult. For example, consider the following constraint: "Name and Destination taken together are Secret if destination is a Middle-east country". Such a constraint depends on data values. Therefore, they are best handled during either query and update processing.

The organization of this paper is as follows. In section 6.2 we describe an algorithm which determines the security levels of the attributes given a set of association-based constraints. A tool could be developed based on this algorithm which the SSO could use to design the schema. In section 6.3 we describe how simple constraints could be handled during database design. Finally in section 6.4 we discuss how logical constraint may be processed.

4.2 HANDLING ASSOCIATION-BASED CONSTRAINTS

In this section we describe an algorithm for handling association-based constraints. The input to this algorithm is a set of association-based constraints and a set of attributes. The output of this algorithm is a set of clusters for each security level. Each cluster for a security level L will have a collection of attributes that can be safely classified at the level L. That is, if A1, A2, and A4 are attributes in a cluster C at level Secret, then the attributes A1, A2, and A3 can be classified together safely at the security level Secret without violating security. The clusters are formed depending on the association-based constraints which are input to the program. Once the clusters are formed, then the database can be defined according to the functional and multivalued dependencies that are enforced.

ALGORITHM HABC (Handling Association-Based Constraints) Begin

Let C be the set of security constraints and W1, W2, ..... Wm be the set of attributes which are input to the program.

For each security level L, do the following:
Begin
Let C[L]be the largest subset of C and A={A1,A2, . . . An} be the largest subset of {W1, W2, ... Wm}, such that the elements of subset of C and A are all visible at level L.
Since n is the number of attributes which are visible at level L, clusters C1, C2, ... Cn will be formed as follows:
Set C1=C2=C3=. . . =Cn=Empty-set. For each i(1<i<n) do the following:
Begin
Find the first cluster Cj(1<j<n) such that Ai, together with any of the attributes already in Cj, is classified at a level dominated by L by the set of constraints C[L]. Place Ai in the cluster Cj. (Note that since we have defined n clusters, there will definitely be one such Cj.)
End (for each i).
Output all the non-empty clusters along with the security level L. End (for each security level L).
End (HABL)

Theorem 1: Algorithm HABL is Sound.
Proof of Theorem 1:
We need to show that for every security level L, the attributes in a cluster formed at L can safely be stored together in a file at level L.

Let C be a cluster at level L, and let B1, B2, .... Br be the attributes in C. Note that before each Bi is placed, it will be first checked to determine whether or not there is an association-based constraint which classifies Bi together with any subset of the attributes B1, B2, ... Bi-1 already in C at a level not dominated by L. If so, Bi would not have been placed in the cluster C.

Since this is true for each Bi ($1<i<r$), there is no association-based constraint which classifies any subset of B1, B2, ... Br taken together at a level not dominated by L. Therefore, B1, B2, ... Br can be safely stored in a file at level L.

Theorem 2: Algorithm HABL is Complete.
Proof of Theorem 2:

We need to show that, if Ci and Cj are two clusters at a level L, there are subsets A and B, respectively, of Ci and Cj, such that A and B cannot be stored together in a file at level L.

Let $i<j$. Then the cluster Ci appears before Cj, in the enumeration of the clusters formed at level L.

Suppose, on the contrary, that A and B do not exist. Consider an element X of cluster Cj. Since Ci is before Cj in the enumeration, before placing X in Cj, it would have been first checked to determine whether or not X can be placed in Ci. It would have been found that there was an association-based constraint which classifies X together with the attributes already in subset P of Ci at a level not dominated by L. That is, the subset P and {X} of Ci and Cj respectively cannot be stored in a file at level L. That is, we have found two sets A and B, which are subsets of Ci and Cj, respectively, which cannot be stored in a file at level L. This is a contradiction to our assumption.

We now trace the algorithm with a simple example.

Let the attributes be A1, A2, A3, A4, A5. Let the constraints be the following:

CON1:A1·A2=Secret*
By "A1·A2=Secret" is meant: A1 and A2 taken together are classified at the Secret level
CON2:A1·A5=Secret
CON3:A1·A4·A5=Secret
CON4:A2·A4=Secret
CON5:A3·A4=Secret Note that some of the constraints are redundant. For example, CON2 implies CON3. In this paper we are not concerned with the redundancy of the constraints.

Since the maximum classification level assigned is Secret, aH the attributes can be stored in a file at the level Secret or Higher. At the Unclassified level, the following clusters are created:

C1={A1, A3}
C2={A2, A5}
C3={A4}

It should be noted that, although the algorithm guarantees that the constraints are processed securely, it does not provide any guarantee that the attributes are not overclassified. More research needs to be done in order to develop an algorithm which does not overclassify an attribute more than is necessary.

4.3 A NOTE ON SIMPLE CONSTRAINTS

Since simple constraints classify individual attributes at a certain security level, they could also be handled during database design. Note that when an attribute A in relation R is classified at level L, then all elements which belong to A is also classified at level L. Therefore, we can store A itself at level L.

The algorithm which handles simple constraint is straightforward. Each attribute that is classified by a simple constraint is stored at level specified in the constraint. Once the algorithm for processing simple constraints is applied and the corresponding schema is obtained, then this schema is given as input to the algorithm handling association-based constraints. The association-based constraints are then applied and the final schema is obtained.

We illustrate the combined algorithm with an example. Let relation R have attributes A1, A2, A3, A4. Let the constraints enforced be the following:

Simple constraint: A4 is Secret Association-based constraint: A2 and A3 together are TopSecret.

Applying the algorithm for handling simple constraints we obtain the following A1, A2, A3 are Unclassified; A1, A2, A3, and A4 are Secret.

Next we apply the algorithm for handling association-based constraints. The final output is: A1 and A2 are Unclassified; A1, A2, and A4 are Secret; A1, A2, A3, are A4 are TopSecret.

4.3 HANDLING LOGICAL CONSTRAINTS

Logical constraints are rules that can be used to deduce new data frown existing data. If a security constraint classifies the new data at a level that is higher than of the existing data, then the existing data must be re-classified. Logical constraints could be straightforward such as $Ai==>Aj$ or they could be more complex such as $A1\ \&\ A2\ \&\ A3\ \&\ \ldots\ An==>Am$. If Aj is classified at the Secret level then A must be classified at least at the Secret level. If Am is classified at the Secret level, then at least one of A1, A2, ... An must be classified at least the Secret level.

In section 4 we showed how the logical constraints may be handled during query processing. For example consider the constraint $AiAn==>Aj$. If Aj is classified at the Secret level, and an Unclassified user requests for Ai values, the query processor will ensure that the Ai values are not released. That is, although Ai may be explicitly assigned the Unclassified level, since the logical constraint is treated as a derivation rule, it does not cause any inconsistency. That is, during query processing, the security level of Ai will be computed to be Secret.

For logical constraints which do not have any conditions attached, it appears that they could be handled during database design. That is during design time the logical constraints are examined, and the security levels of the attributes specified in the premise of a constraint could be computed. For example, if Aj is classified at the Secret level then it must be ensured during design time that Ai classified at least at the Secret level also. The following algorithm will ensure that the security levels are computed correctly.

1. Do the following each logical constraint. (Note that we have assumed that the constraints are expressed as horn clauses. That is, there is only one atom in the head of a clause).
2. Check whether there are any simple constraints which classify the attribute appearing in the head of the logical constraint at any level. If not, ignore the constraint.
3. If so, find the highest security level L that is specified for this attribute.
4. Check whether any of the attributes appearing as premises of the logical constraint are classified at least at level L. If so, ignore the constraint.
5. If not, classify one of the attributes (say, the first one) at the level L.

The algorithm given above does not ensure that the attributes are not overclassified. In order to avoid the overclassification problem, modification must be made to step 5. That is, once an attribute is assigned a security level, it is possible for the level to be re-assigned based on other logical constraints that are handled. Our current research includes investigating techniques for successfully assigning security levels to the attributes and at the same time avoiding overclassification.

When logical, simple, and association-based constraints are combined, then the first step would be to handle the simple constraints. The next step would be to apply the algorithm given above for the logical constraints. Finally, the algorithm given in section 6.2 is applied for the association-based constraints.

5. TOWARDS AN INTEGRATED APPROACH

Consider the integrated architecture illustrated in FIG. 5. This architecture provides an integrated solution to constraint processing in a multilevel environment. In this section we describe this integrated solution using an operational example. The example is explained in natural language.

Time to: Constraint Generator produces the following output: The database consisting of the relations SHIPS and GROUPS. Both relations are Unclassified. The attributes of SHIPS are Number, Name, Class, Data, and Assignment. Its primary key is Number. The attributes of GROUPS are Number, Location, Mission, and Siop. Its primary key is Number. SHIPS.Assignment and GROUPS.Number take values from the same domain. Also, SHIPS.Assignment is a foreign key. Following are the Security Constraints: GROUPS.Location and GROUPS.Mission taken together are Secret; SHIPS.Name is Secret if SHIPS.Class=Los Angeles.

Time T1: Database Design Tool Produces the following output: The database consists of three relations SHIPS, GROUPS, and GRP-MISS. The relations SHIPS and GROUPS are Unclassified. The relation GRP-MISS is Secret. The attributes of SHIPS are Number, Name, Class, Date, and Assignment. Its primary key is Number. The attributes of GROUPS are Number, Location and Siop. Its primary key is Number. The attributes of GRP-MISS are Number and Mission. SHIPS. Assignment and GROUPS. Number take values from the same domain. GROUPS. Number and GRP-MISS. Number take values from the same domain. Also, SHIPS. Assignment is a foreign key. Following Security Constraint is enforced: SHIPS. Name is Secret if SHIPS. Class=Los Angeles.

Time T2: The Update Processor populates the database as follows. Note that we have included security level as a field in the relations; 1=Unclassified, 10=Secret.

| | | Relation SHIPS | | | |
|---|---|---|---|---|---|
| Number | Name | Class | Date | Assignment | Level |
| CVN 68 | Nimitz | Nimitz | May 75 | 003 | 1 |
| CV 67 | John F. Kennedy | John F. Kennedy | Sep 68 | 001 | 1 |
| BB 61 | Iowa | Iowa | Feb 43 | 003 | 1 |
| CG 47 | Ticonderoga | Ticonderoga | Jan 83 | 005 | 1 |
| DD 963 | Spruance | Spruance | Sep 75 | 006 | 1 |
| AGF 3 | La Salle | Converted Raleigh | Feb 64 | 003 | 1 |
| WHEC 715 | Hamilton | Hamilton | Feb 67 | 003 | 1 |
| FFG 7 | Oliver Hazard Perry | Oliver Hazard Perry | Dec 77 | 001 | 1 |
| FF1052 | Knox | Knox | Apr 69 | 001 | 1 |
| LSD 36 | Anchorage | Anchorage | Mar 69 | 009 | 1 |
| LHA 1 | Tarawa | Tarawa | May 76 | 003 | 1 |
| MCM 1 | Avenger | Avenger | Sep 87 | 003 | 1 |
| AOR 1 | Whichita | Whichita | Jun 69 | 003 | 1 |
| AFS 1 | Mars | Mars | Dec 63 | 001 | 1 |
| AE 21 | Suribachi | Suribachi | Nov 56 | 009 | 1 |
| AE 23 | Nitro | Nitro | May 59 | 005 | 1 |
| AO 177 | New Cimarron | New Cimarron | Jan 81 | 001 | 1 |
| SSN 706 | Albuquerque | Los Angeles | May 83 | 006 | 10 |
| CVN 65 | Enterprise | Enterprise | Nov 61 | 009 | 1 |
| MSO 427 | Constant | Aggressive | Sep 54 | 001 | 1 |

| | Relation Groups | |
|---|---|---|
| Number | Location | Siop |
| 001 | North Atlantic | 001 |
| 002 | South Atlantic | 002 |
| 003 | Mediterranean | 006 |
| 004 | Philippines | 005 |
| 005 | Persian Gulf | 004 |
| 006 | Indian Ocean | 004 |
| 007 | North Sea | 003 |
| 008 | North Atlantic | 003 |
| 009 | North Pacific | 001 |

| | Relation GRP-MISS | |
|---|---|---|
| Number | Mission | Level |
| 001 | naval exercises | 10 |
| 002 | falklands patrol | 10 |
| 003 | iraq crisis | 10 |
| 004 | stabilize government | 10 |
| 005 | iraq crisis | 10 |
| 006 | naval exercises | 10 |
| 007 | soviet reconnaissance | 10 |
| 008 | oceanographic research | 10 |
| 009 | oceanographic research | 10 |

Time T3: Unclassified user poses queries to select all from SHIPS and GROUPS.

Result: He will get all of the tuples in GROUPS and all of the tuples in SHIPS except the one at the level 10 (i.e. the tuple whose ship class is Los Angeles).

Time T4: Real world changes. The constraint which originally classifies locations and missions together at the Secret level is removed. Note that such a constraint is not in the constraint database. Two new constraints are introduced. One classifies tuples in GROUPS where the location is Persian Gulf at the Secret level. The other classifies ship names and assignments taken together at the Secret level.

The Constraint database is updated to include the two new constraints. We assume that no changes are made to the database or to the schema. The constraint updater informs the query processor of the inconsistency.

Time T5: An Unclassified user poses the same query; that is to retrieve all tuples from SHIPS and GROUPS.

Result: He will get all values for the attributes SHIPS. Number, SHIP. Name, SHIP. Class, and SHIPS. Date provided SHIPS. class does not have the value Los Angeles. He will not get any values for SHIPS. Assignment. He will get all tuples from GROUPS where the location is not Persian Gulf. Although GRP-MISS need not be classified at the Secret level, the user will still not get any data from GRP-MISS as the relation has not yet been downgraded.

Time T6: The database is re-designed and the database data is re-classified.

There are three relations SHIPS, SH-ASSIG, and GROUPS. SHIPS and GROUPS are Unclassified, SH-ASSIG is Secret. The attributes of SHIPS are Number, Name, Class, and Date. Its primary key is Number. SH-ASSIG has attributes Number and Assignment. SH-ASSIG. Number SHIPS. Number i s primary key. SHIPS. Number and SH-ASSIG. Number take values from the same domain. The attributes of GROUPS are Number, Location, Mission, and Siop. Its primary key is Number. SH-ASSIG. Assignment and GROUPS. Number take values from the same domain. Also, SH-ASSIG. Assignment is a foreign key. Following are the Security Constraints: SHIPS. Name is Secret if SHIPS. Class=Los Angeles, Each of GROUPS. Number, GROUPS. Location, GROUPS. Mission, and GROUPS. Siop is Secret if GROUPS. Location=Persian Gulf. The database is populated as shown below.

| Relation Groups | | | | |
|---|---|---|---|---|
| Number | Location | Mission | Siop | Level |
| 001 | North Atlantic | naval exercises | 001 | 1 |
| 002 | South Atlantic | falklands patrol | 002 | 1 |
| 003 | Mediterranean | iraq crisis | 006 | 1 |
| 004 | Philippines | stabilize government | 005 | 1 |
| 005 | Persian Gulf | iraq crisis | 004 | 10 |
| 006 | Indian Ocean | naval exercises | 004 | 1 |
| 007 | North Sea | soviet reconnaissance | 003 | 1 |
| 008 | North Atlantic | oceanographic research | 003 | 1 |
| 009 | North Pacific | oceanographic research | 001 | 1 |

| Relation SH-ASSIG | | |
|---|---|---|
| Number | Assignment | Level |
| CVN 68 | 003 | 10 |
| CV 67 | 001 | 10 |
| BB 61 |  | 10 |
| CG 47 | 005 | 10 |
| DD 963 | 006 | 10 |
| AGF 3 | 003 | 10 |
| WHEC 715 | 003 | 10 |
| FFG 7 | 001 | 10 |
| FF1052 | 001 | 10 |
| LSD 36 | 009 | 10 |
| LHA 1 | 003 | 10 |
| MCM 1 | 003 | 10 |
| AOR 1 | 003 | 10 |
| AFS 1 | 001 | 10 |
| AE 1 | 009 | 10 |
| AE 23 | 003 | 10 |
| AO 177 | 001 | 10 |
| SSN 706 | 006 | 10 |
| CVN 65 | 009 | 10 |
| MSO 427 | 001 | 10 |

| Relation SHIPS | | | | |
|---|---|---|---|---|
| Number | Name | Class | Date | Level |
| CVN 68 | Nimitz | Nimitz | May 75 | 1 |
| CV 67 | John F. Kennedy | John F. Kennedy | Sep 68 | 1 |
| BB 61 | Iowa | Iowa | Feb 43 | 1 |
| CG 47 | Ticonderoga | Ticonderoga | Jan 83 | 1 |
| DD 963 | Spruance | Spruance | Sep 75 | 1 |
| AGF 3 | La Salle | Converted Raleigh | Feb 64 | 1 |
| WHEC 715 | Hamilton | Hamilton | Feb 67 | 1 |
| FFG 7 | Oliver Hazard Perry | Oliver Hazard Perry | Dec 77 | 1 |
| FF1052 | Knox | Knox | Apr 69 | 1 |
| LSD 36 | Anchorage | Anchorage | Mar 69 | 1 |
| LHA 1 | Tarawa | Tarawa | May 76 | 1 |
| MCM 1 | Avenger | Avenger | Sep 87 | 1 |
| AOR 1 | Whichita | Whichita | Jun 69 | 1 |
| AFS 1 | Mars | Mars | Dec 63 | 1 |

| | | | | |
|---|---|---|---|---|
| AE 21 | Suribachi | Suribachi | Nov 56 | 1 |
| AE 23 | Nitro | Nitro | May 59 | 1 |
| AO 177 | New Cimarron | New Cimarron | Jan 81 | 1 |
| SSN 706 | Albuquerque | Albuquerque | May 83 | 10 |
| CVN 65 | Enterprise | Enterprise | Nov 61 | 1 |
| MSO 427 | Constant | Aggressive | Sep 54 | 1 |

Time T7: Unclassified user poses queries to select all from SHIPS and GROUPS.

He will get all tuples from SHIPS except the one with class=Los Angeles. he will get all tuples from GROUPS except the one with location=Persian Gulf. He will not get any tuples from SH-ASSIG.

We claim:

1. Apparatus for an integrated architecture for an extended multilevel secure database management system which processes security constraints to control unauthorized inference through logical deduction upon queries by users and implemented when the database is queried through the database management system, when the database is updated through the database management system, and when the database is designed, the integrated architecture comprising:

a knowledge base for storing the security constraints, application data and information on responses released from the multilevel secure database management system;

a multilevel database which contains data classified at different security levels;

a multilevel metadatabase to store schemes describing data in the multilevel database, the schemas classified at said different security levels;

the multilevel secure database management system utilized to access the multilevel database for queries and updates and to access the multilevel metadatabase for querying and updating the schemas by users cleared to said different security levels;

a query processor augmenting the multilevel secure database management system and accessing the knowledge base to examine the security constraints, application data and responses already released and to modify queries to prevent unauthorized inferences and to output a modified query for evaluation by the multilevel secure database management system, the multilevel secure database management system providing an output to the query processor which examines the security constraints, the application data, and responses already released, and modifies the responses to prevent unauthorized inferences, an update processor augmenting the multilevel secure database management system for examining some of said security constraints and to assign security levels to the data;

the update processor complementing functions of the query processor such that if some of the constraints are processed during updates and the data is assigned appropriate security levels, said constraints need not be processed by the query processor, for performance enhancement the said update processor also being used as an off-line tool to determine the security levels of the data;

a multilevel database design tool which examines some of the security constraints and assigns security levels to the schemas, the schemas then being input to the multilevel secure database management system for storage in the multilevel metadatabase at the appropriate security levels, the design tool thereby complementing the functions of the query processor so that said some of the constraints need not be processed by the query processor for performance enhancement; and a user interface which accepts query requests from the user and passes the query to the query processor and accepts update requests from the user and passes it to the update processor if operating on-line or the user interface accepts the request from the user and passes it to the multilevel database management system if it is off-line, the user interface accepting the schema query request from the user and passes the query request to the multilevel secure database management system, the user interface further accepting the schema update requests from the user and passes it to the multilevel secure database management system.

2. The apparatus of claim 1 wherein the query processor comprises:

a user interface manager to provide the user interface and to accept the query requests;

a constraint manager to manage the security constraints and the knowledge base;

a query modifier which receives query requests from the user interface manager, examines the security constraints by communicating with the constraint manager and subsequently modifies the query which is evaluated against the multilevel secure database management system;

a response processor which accepts the response from the multilevel secure database management system, examines the security constraints by communicating with the constraint manager, and determines which parts of the response are to be released to the user; and a release database manager which manages the release information and provides input to the query modifier and the response processor to carry out their functions.

3. The apparatus of claim 1 wherein the update processor comprises:

a user interface manager for communicating with the user;

a constraint manager which manages the security constraints;

a security level computer which communicates with the constraint manager and computes the security level of data to be updated; and a level upgrader which gets an input from the security level computer, creates an update process at the appropriate level and interfaces to the multilevel secure database management system.

4. The apparatus of claim 1 wherein the multilevel database design tool is a monolithic module whose inputs are the security constraints and initial schemas, and whose outputs are modified schemas and their security levels which can be entered into the multilevel metadatabase.

* * * * *

UNITED STATES PATENT AND TRADEMARK OFFICE
CERTIFICATE OF CORRECTION

PATENT NO. : 5,355,474
DATED : October 11, 1994
INVENTOR(S) : Bhavani M. Thuraisingham, et al It is certified that error appears in the above-indentified patent and that said Letters Patent is hereby corrected as shown below:

On the title page item [76], change the name of the first named inventor from "Thuraisngham" to -- Thuraisingham --.

Column 2, line 49: please delete "are" and insert therefor -- is --;

Column 4, line 51: after "data" and before "which" please insert -- for --;

Column 4, line 54: please "Logan" and insert therefor -- log on --;

Column 6, line 36: please delete "constraint" and insert therefor -- constraints --;

Column 9, line 56 footnote (*): please delete "[HONE87]" and insert therefor -- Honeywell, Inc. "Security Policy for Lock Data Views," Interim Report for TADC, March 1987 (Boebert, Dillaway, Dwyer, Haigh and Thuraisingham) --

Column 11, line 24: please delete "preformed" and iinsert therefor --performed--;

Column 11, line 30: please delete "foundations" and insert therefor -- Foundations --;

Column 12, line 40 footnote (*): please delete "the" and insert therefor -- The --;

Column 12, line 40 footnote (*): please delete "[ROWE89]" and insert therefor -- Rowe, N., February 1989, "Inference Security Analysis Using Resolution Theorem-Proving," Proceedings of the 5th International Conference on Data Engineering, Los Angeles, CA --;

Column 14, line 2: after "process." please insert -- * --;

Column 14, line 2 footnote (*): please delete "although" and insert therefor -- Although --;

Column 22, line 28: please delete "deraris" and insert therefor -- details --;

Column 22, line 30: please delete "SEcure" and insert therefor -- Secure --;

UNITED STATES PATENT AND TRADEMARK OFFICE
CERTIFICATE OF CORRECTION

PATENT NO. : 5,355,474
DATED : October 11, 1994
INVENTOR(S) : Bhavani M. Thuraisingham, et al It is certified that error appears in the above-indentified patent and that said Letters Patent is hereby corrected as shown below:

Column 23, line 18: please delete "spedties" and insert therefor -- specifies --;

Column 23, line 35: please delete "an" and insert therefor -- and --;

Column 23, line 47: please delete "enter" and insert therefor -- entered --;

Column 24, line 25: please delete "valattic" and insert therefor -- volatile --;

Column 27, line 17: please delete "t" and insert therefor -- to --;

Column 28, line 27: please delete "t" and insert therefor -- to --;

Column 29, line 51: please delete "wait" and insert therefor -- waits --;

Signed and Sealed this

Sixteenth Day of May, 1995

Attest:

BRUCE LEHMAN

*Attesting Officer*  *Commissioner of Patents and Trademarks*